(12) United States Patent
Prabhu et al.

(10) Patent No.: US 10,002,286 B1
(45) Date of Patent: *Jun. 19, 2018

(54) SYSTEM AND METHOD FOR FACE RECOGNITION ROBUST TO MULTIPLE DEGRADATIONS

(71) Applicant: Carnegie Mellon University, Pittsburgh, PA (US)

(72) Inventors: Utsav Prabhu, Pittsburgh, PA (US); Marios Savvides, Wexford, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 81 days.

This patent is subject to a terminal disclaimer.

(21) Appl. No.: 15/140,857

(22) Filed: Apr. 28, 2016

Related U.S. Application Data

(60) Provisional application No. 62/179,119, filed on Apr. 28, 2015, provisional application No. 62/179,121, filed on Apr. 28, 2015, provisional application No. 62/179,132, filed on Apr. 28, 2015.

(51) Int. Cl.
*G06K 9/62* (2006.01)
*G06K 9/00* (2006.01)
*G06T 7/40* (2017.01)
*G06F 17/30* (2006.01)

(52) U.S. Cl.
CPC ..... *G06K 9/00288* (2013.01); *G06F 17/3028* (2013.01); *G06F 17/30247* (2013.01); *G06K 9/00255* (2013.01); *G06T 7/40* (2013.01); *G06T 2207/30204* (2013.01)

(58) Field of Classification Search
CPC ........... G06K 9/00288; G06K 9/00295; G06K 9/00275
See application file for complete search history.

(56) References Cited

U.S. PATENT DOCUMENTS

2009/0052748 A1* 2/2009 Jiang ................. G06K 9/00208
382/118
2016/0371535 A1* 12/2016 Li ..................... G06K 9/00288

\* cited by examiner

*Primary Examiner* — Brian Werner

(57) ABSTRACT

A novel, unified technique for analyzing, synthesizing, and recognizing faces captured by various modalities, and under a variety of often seen real-world circumstances, using thin-plate splines for densification of points of a face from an initial set of fiducial points.

17 Claims, 27 Drawing Sheets

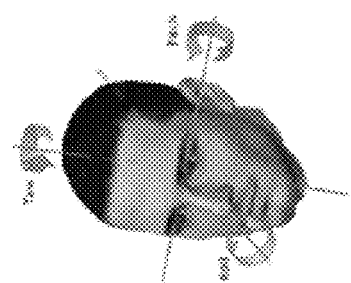
FIG. 5

Algorithm 1 The WGHA Algorithm initialize: basis matrix B to a random matrix of size d x k, learning rate n = 0.1
repeat
   Construct index set $\Lambda_n$ by random sampling b indices from {1:n} with replacement
   for i $\in \Lambda_n$ do
     Compute weighted projection of data element $$c_{(.,i)} = (B^T W^2_{(.,i)} B + \lambda c I)^{-1} B^T W^2_{(.,i)} m_{(.,i)}$$

end for
   Update basis using batch update rule $$B = B + \eta (W_{(.,\Lambda_n)} \odot (M_{(.,\Lambda_n)} - BC_{(.,\Lambda_n)})) C_{(.,\Lambda_n)}$$

Orthonormalize basis by Gram Schmidt procedure $B = BR^{-1}$
   Update learning rate n = n * 0.9
until converged.

FIG. 24

Algorithm 2 The WK-SVD Algorthm initialize: the dictionary matrix B to k elements of the data
repeat
   Sparse Coding Stage:
   Use OMP (or other pursuit algorithm) to approximate the solution of $$\hat{C} = \arg\min_{C} \|W \odot (M - BC)\|_F^2 \quad \text{s.t.} \quad \|C_{(i,\cdot)}\|_0 \leq \alpha \; \forall i$$

Dictionary Update Stage:
   for i = 1,...,k do
     Identify the set $\Lambda_i$ of data items which have a non-zero support in the $i^{th}$ dictionary atom.
     Compute the representation error for all data items in the support of this dictionary atom.

$$E_i = M_{(\cdot, \Lambda_i)} - \sum_{j \neq i}^{k} b_j C_{(j, \Lambda_i)}$$

Book-keeping: Identify the set $\Gamma_i$ such that $\sum_{j \in \Lambda_i} W_{(\Gamma_i, 1)} \neq 0$
   repeat
     Power Factorization:

$$\hat{c} = (\hat{b}^T W^2_{(\Gamma_i, \Lambda_i)} \hat{b} + \lambda_C I)^{-1} \hat{b}^T W^2_{(\Gamma_i, \Lambda_i)} M_{(\Gamma_i, \Lambda_i)}$$

$$\hat{b} = (\hat{c}^T W^2_{(\Gamma_i, \Lambda_i)} \hat{c} + \lambda_B)^{-1} \hat{c}^T W^2_{(\Gamma_i, \Lambda_i)} M_{(\Gamma_i, \Lambda_i)}$$

$$\hat{b} = \hat{b} / \|\hat{b}\|$$

until converged.
   Update $b_{(\Gamma_i, i)} = \hat{b}, \hat{c}_{(\Gamma_i, i)} = \hat{c}$
   end for
until converged.

FIG. 25

SYSTEM AND METHOD FOR FACE RECOGNITION ROBUST TO MULTIPLE DEGRADATIONS

RELATED APPLICATIONS

This application claims the benefit of U.S. Provisional Patent Applications Nos. 62/179,119, filed Apr. 28, 2015, 62/179,121, filed Apr. 28, 2015 and 62/179,132, filed Apr. 28, 2015, all of which is incorporated herein in their entireties.

BACKGROUND OF THE INVENTION

Notwithstanding several decades of extensive research, the problem of automatic face recognition in a truly unconstrained setting has not yet been solved. As an identifiable biometric modality, faces provide several advantages over other physiological traits such as fingerprints and iris patterns. They are easily acquired by imaging devices at a distance with minimal cooperation by the individual, and therefore lend themselves well to security and surveillance purposes. Usually they can be captured without any voluntary action by the individual, hence offering perhaps the least intrusive form of recognition compared to other biometric modalities. Being relatively large objects, they can be captured at considerable distances without significant loss. The acquisition devices themselves (such as handheld or mounted cameras), are not only inexpensive, but pervasive in society. The prevalence of these imaging devices and the ubiquity of digital communication technology has led to the availability of massive amounts of facial image data. Moreover, faces are an intuitive form of person identification, being the primary method employed by the human visual system. The creation of an automated face recognition system that can equal, and eventually surpass, human performance at large-scale tests, has unsurprisingly been a fundamental objective of computer vision researchers since its inception in the 1960's.

Despite the success of automatic face recognition techniques in many practical applications, face recognition systems still have difficulties performing consistently well under uncontrolled operating environments. Evaluations of state-of-the-art recognition techniques conducted during the past several years have confirmed that pose variations, external occlusions, and low resolution acquisition are the major problems that plague current systems. This work aims to solve or provide tolerance to these challenging problems by proposing a unified objective that uses our proposed compact facial representation model in order to recover and deal with a variety of unconstrained facial degradations.

Face recognition addresses the problem of identifying or verifying one or more persons of interest in an image by comparing processed query faces with a corpus of target face images stored in an enrolled database. Identification (also known as 1:N-matching) is the task of determining a person's identity by comparing the observation to a database of previously enrolled individuals, whereas Verification (also known as 1:1-matching) is the task of comparing two observations, and determining whether they belong to the same individual. There are numerous applications in which face recognition can be exploited for one or the other of these purposes. Security is a primary application: this includes access control to physical areas and authentication of individuals at banks, border crossings and airports. Digital security is of particular concern and is becoming increasingly prevalent, using face recognition to restrict access to secure digital information on personal computers, workstations, and mobile devices, by replacing traditional forms of authentication such as passwords. Continuous authentication of users enables secure access without interfering with other activities. Law enforcement agencies exploit face recognition for matching photographs against driver's licenses or passports, and authenticating personnel at checkpoints. Surveillance CCTV cameras employed in restricted areas, public events, and private property, capture large amounts of footage which often goes unprocessed due to the low resolution, uncontsrained nature of the faces captured. The faces in this video can be used for lead-generation during criminal investigation, missing children can be identified, and post-event analysis can be expedited. Forensic identification of faces is particularly important during large scale calamities, electoral registration systems take advantage of face recognition to establish identity.

The understanding, modeling, analysis and synthesis of faces is important in several other ways as well. The biological structure of faces is intensely studied for several medical applications. Graphics designers, movie animation studios, and game studios need to model and synthesize myriad facial structures, deformations, and appearances. Gender and ethnicity classification, and age estimation, can substantially reduce matching complexity when using large databases. Facial feature analysis and tracking finds several applications in human-computer interaction and vehicle driver monitoring.

A reliable biometric demonstrates two important (and occasionally competing) attributes: reliability of features and discriminability between individuals. The primary impediment to automatic face recognition is that the human face is not a unique, rigid object its appearance is subject to vast variation under numerous intrinsic and extrinsic factors, which affects both of these attributes. Instrinsic factors are caused by the physical nature of the face and the individual to which it belongs, and are therefore independent of the observer. These include the age of the person, changes in cranial structure, facial hair growth, facial expressions, cosmetics, wearables such as eyeglasses and scarves, etc. Extrinsic factors cause the appearance of the face to alter via the imaging environment; this includes the scene illumination, the relative orientation and positioning of the imaging device to the face, physical obstructions between the face and the sensor, and the imaging parameters, such as lens zoom, focus, sensor resolution, sensor noise, etc.

The design of an automated face recognition system must necessarily include the ability to identify, model, and account for these intrinsic and extrinsic variations. However, this is not always possible in the general sense; each variation often introduces irrecoverable information loss; some of them are hard to accurately detect and measure, and several of these variations are often observed simultaneously. The human visual system often compensates for such situations by using external inputs, such as holistic scene understanding, contextual information, spatial organization, and con-sequential reasoning. Automated systems do not have these benefits, principally due to physical and technological restrictions. However, they can outperform humans in other ways, such as efficiency in large-scale recognition problems, continuous/long-term monitoring, etc. Semi-automated "human-in-the-loop" systems can thus incorporate the best features of these setups, outperforming both humans and fully-automated systems. The proposed system in this application is amenable to both fully- and semi-automated configurations.

To benefit from the advantages that face recognition offers, a system should be designed to analyze an uncooperative face in uncontrolled environment and an arbitrary situation, overcoming both intrinsic and extrinsic variations. We particularly focus on the challenging, prevalent problems introduced by 3D pose variations, extraneous and self-occlusions, low-resolution acquisition, and combinations of these degradations. Each of these degradations has spurred entire communities of research, we provide a high-level overview in this section outlining a few landmark works. For a more thorough review, the reader is directed towards recent survey papers for face recognition in general, and for specific degradations.

Pose-Invariant Face Recognition

Faces are inherently three-dimensional objects, but are often captured in two-dimensional projections via images or video, leading to severe pose-induced challenges towards recognition, e.g. off-angle viewpoints engender self-occlusions of facial textures. This is particularly problematic in uncooperative applications such as surveillance. The adverse effects of non-frontal poses in face recognition were quantitatively and qualitatively assessed over several evaluations. In a recent comprehensive review of these techniques, it was concluded that no existing techniques at the time were free from limitations or able to fully solve the pose problem in face recognition.

Recognizing Low-Resolution Faces

Low resolution is a major impediment for face recognition systems, primarily caused by the distance of the sensor to the subject, and sensor size and cost limitations. A landmark paper in the field, outlined the detrimental impact of resolution on different components of face recognition. In a recent review of the subject, the performance drop of face recognition systems when provided with low-resolution images was attributed to four distinct factors: misalignment issues, acquisition noise, feature loss and dimensionality mismatch (in certain cases which cannot be addressed by simple resizing).

There are two schools of thought regarding techniques to overcome the problems of low resolution: construction of resolution-tolerant recognition techniques, and image-based super-resolution algorithms. Among these approaches, the former is generally considered to be a harder problem to solve. Face recognition performance degrades gracefully with lowering resolution but exhibits a dramatic performance drop at approximately 12 pixels of inter-pupillary distance (IPD). This has been re-proved many times, most recently in 2011. Resolution-robust feature representations for both global and local features have shown certain improvements over the years, although they are still restricted by the irretrievable information loss endured by long-range acquisition.

Occlusion Tolerant Face Recognition

Occlusions are a consistent cause of hardship in real-world face recognition systems. Sources of occlusion include apparel such as eyeglasses, sunglasses, hats, or scarves, objects such as cell phones placed in front of the face, facial or head hair. Moreover, even in the absence of an occluding object, violations of an assumed model for face appearance may act like occlusions: e.g., shadows due to extreme illumination.

Compared to the other degradations, research in the field of face recognition under facial occlusions has been rewarding. Simple techniques using pixel correlation and in-painting have achieved moderate prominence in visual reconstruction, but are ineffectual for large-scale recognition tasks. Morphable models have been adapted to handle occlusions in a global framework with moderate success. Sparse coding techniques have recently demonstrated impressive results when compared to other techniques in dealing with recovery of occluded data. Other families of techniques have also been successful by incorporating occlusion masks, which are either manually provided or automatically detected.

Handling Simultaneous Degradations

Very few works have tried to address the problems introduced by simultaneous sources of acquisition degradation to faces, despite the construction of several databases which capture the appearance variations concurrently. No known previous work has explicitly attempted face recognition under the simultaneous conditions of 3D pose, occlusions, low resolution, and other real-world degradations.

SUMMARY OF THE INVENTION

Faces observed in the wild are often subject to several degradations, including, for example, partial occlusions, 3D pose variations and low-resolution capture. Each of these factors drastically effect performance of automated facial software, and often multiples of these effects are concurrently observed.

The system and method of the present invention for recovery, analysis, synthesis, and recognition of faces having multiple degradations reinterprets acquisition degradation as a missing-data problem. A novel spline-based representation of faces (thin-plate spline, or TPS) is used for recovery, and a linear data completion technique is used to recover facial information. Two such linear data completion techniques are discussed herein. The recognition results demonstrate that the proposed method can outperform prior art commercial face recognition engines, as well as improve their performance when used as a pre-processing engine. The system is amenable to both fully- and semi-automated configurations.

BRIEF DESCRIPTION OF THE DRAWINGS

FIG. 5 shows 3D pose angles and their induced effects. (L to R) Definition of the pitch $\theta$, yaw $\phi$ and roll $\psi$ angles used, three different pose angles of the same subject, showing self-occlusions and appearance variations in different parts of the face.

FIG. 24 shows the WGHA algorithm.

FIG. 25 shows the WK-SVD algorithm.

DETAILED DESCRIPTION OF THE INVENTION

Figure 1:
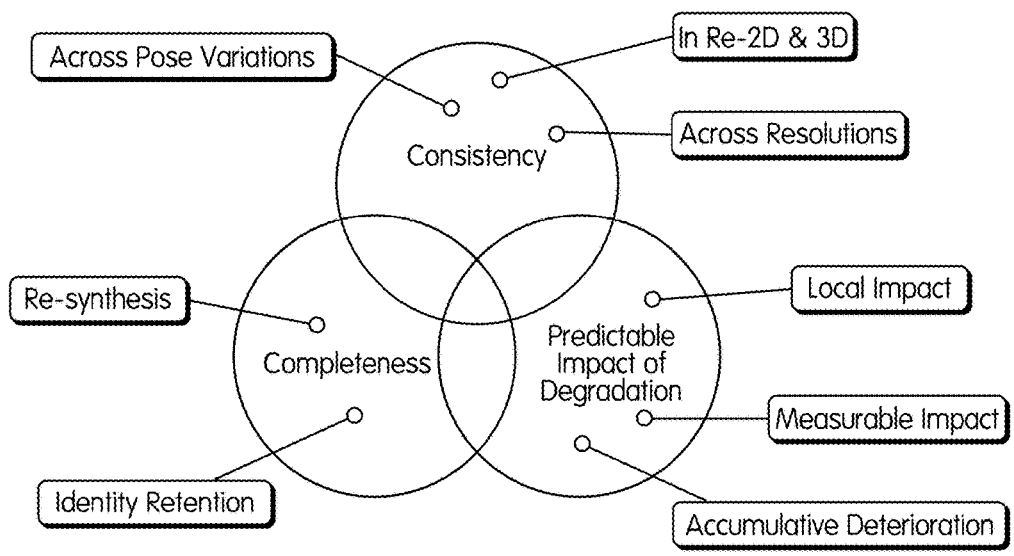
FIG. 1 shows the attributes of an ideal model space representation for recoverability of faces.

As a basis for starting the discussion of the system and method, an image of standard resolution is obtained from any manner of image sensing apparatus, including a camera, a video, a scanner, etc. In addition, the method may operate on existing images, obtained, for example, by downloading from the Internet or reading from an electronic file.

Consider the case of a high-quality, high-resolution, low-noise 3D scanner from which is acquired a 3D scan of a face under controlled conditions, i.e. neutral facial expression, frontal pose, controlled uniform ambient illumination with no directed illuminant, and no occlusions on the face. Intuitively, the entire information of the face is included in this 3D scan, inclusive of textural as well as structural details, and hence one can consider this scan to be a complete representation of the face.

Now consider the same face, under the same conditions, acquired by a high-quality, high-resolution, low-noise 2D imaging system instead, from a frontal viewpoint, as in a typical passport photograph. Arguably, this image representation of the face contains all of the information in the earlier 3D representation, except for the structural components along the z-direction, i.e. along the vector joining the face to the center of the camera lens. This is mostly true of faces, primarily due to their approximately-convex structure, resulting in no self-occlusions when observed from this viewpoint.

Further, consider another acquisition by a similar 2D camera and under similar acquisition conditions, only this time with the subject wearing sunglasses. Other than the structural components along the z-direction, there are now also textural as well as structural details in the periocular region of the face that would be missing or corrupted.

To take it even one step further, consider yet another acquisition under similar conditions as the previous case, only using a low-resolution camera instead of a high-resolution one. A simple model of a low-resolution camera sensor could be one which only samples one out of every few pixels of a corresponding high-resolution camera sensor. Using such a model, one could surmise that in this case, besides the z-directed structural information and the information about the periocular part of the face, there is also further information missing, distributed all over the face, in both textural as well as structural details.

From the perspective of available information, many forms of acquisition degradation, such as described above can be viewed as missing data, and can result in a local, measurable and accumulative impact on a prudently designed representation of the face. With an adequate understanding of the impact of each degradation, a representation for which these properties are appropriate can be designed. In such a representation, recovery of the original face, given an acquisition which contains a combination of different types of degradations, can be viewed as a missing-data completion problem, which can be solved using a variety of techniques (along with sufficient training data).

The efficacy of the system is impacted directly by three major attributes of the data: (1) the number and severity of degradations on the acquired face, (2) the accuracy and completeness of measurement of the available information (i.e. the veracity of the model representation), and (3) the effectiveness of the missing data completion technique with the given training data.

Three fundamental attributes have been identified, as shown in FIG. 1, that the ideal model space representation must possess in order for the proposed approach to be maximally effective. Different applications may require a subset of these properties, based on the particular situation and desired outcome:

P1—Consistency:

Ideally, the extraction of an n-dimensional feature vector from the face should be such that each of the n dimensions represents consistent and corresponding information from the face. In most pattern recognition studies, this is an obvious and trivial detail, since the domain of the input is typically constrained. In this work, however, we will require to analyze myriad types of data, (including both 2D as well as 3D faces, at varying pose, resolution, etc.), hence making consistency of representation a harder challenge. Moreover, given the varied types of face degradation, this step turns out to be a non-trivial problem, especially for conditions such as out-of-plane rotation and low resolution.

P2—Completeness:

The entire information contained in the face should be represented in the model space, i.e. it should include a complete and highly detailed representation of the face. Most data completion techniques use available information to impute (i.e. recover) missing data. The inclusion of all possible information from the face enables the best possible result, independent of completion technique. This property implies:

Re-Synthesis:

of the face is possible from the model space. This is required so that the resulting face can be rendered as an image or a 3D model. Most applications require synthesis as the output, although some applications may not require this, such as recognition. However, even in the case of recognition, it is useful to be able to synthesize a result so as to enable the use of other (commercial) recognition tools.

Identity Retention:

Some amount of identity discriminability is retained in the model space. In some cases, we can use the model space, or derivatives thereof, directly towards tasks such as recognition, without requiring a reconstitution step back to the face structure.

P3—Predictable Impact Under Degradation:

The feature representation should be such that a known degradation in acquisition affects a correspondingly calculable subset of the d dimensions of the model representation to a calculable degree, for all the expected types of degradation that are expected to be observed. This property implies:

Local Impact:

In the ideal case the complement of this affected subset should be entirely unaffected by the degradation. This is difficult to achieve in practice for most types of degradations. However, it is reasonable to expect the impact of the degradation on the "clean" elements to be minimal.

Measurable Impact:

Some data completion techniques could take advantage of a confidence measure (probabilistic or otherwise) of the effect of the observed degradation on each dimension of the model representation. However, in practice it is difficult to estimate such as measure due to the unpredictable and random nature of degradations observed in the real world.

Accumulative Deterioration:

A progressively increasing deterioration of the quality of acquisition should result in a corresponding progression of increase in the cardinality of the affected subset of the model representation. At the trivial case of no degradation, the entire model representation should be unaffected.

To generalize the feature extraction protocol disclosed herein to work with 2D and 3D faces under many different conditions, a typical detect-align-normalize sequence of preprocessing operations is followed, a process which is widely adopted in the facial analysis community. While contributions of this invention is directed towards normalization of faces, this work relies upon a wealth of existing literature in the fields of automatic face detection, 3D pose estimation, and fiducial landmark localization is.

As a beginning point of the explanation of the novelty of the invention, assume that any one set of several existing landmark configurations is available, along with the image or 3D model under consideration. For the cases where these fiducial points are not available, we could use the Modified Active Shape Models (MASM) technique to obtain them for images, and Procrustes analysis or Iterative Closest Point (ICP) based approaches to align the 3D data.

Dense Correspondences Estimation from Sparse Landmarks

Figure 26:
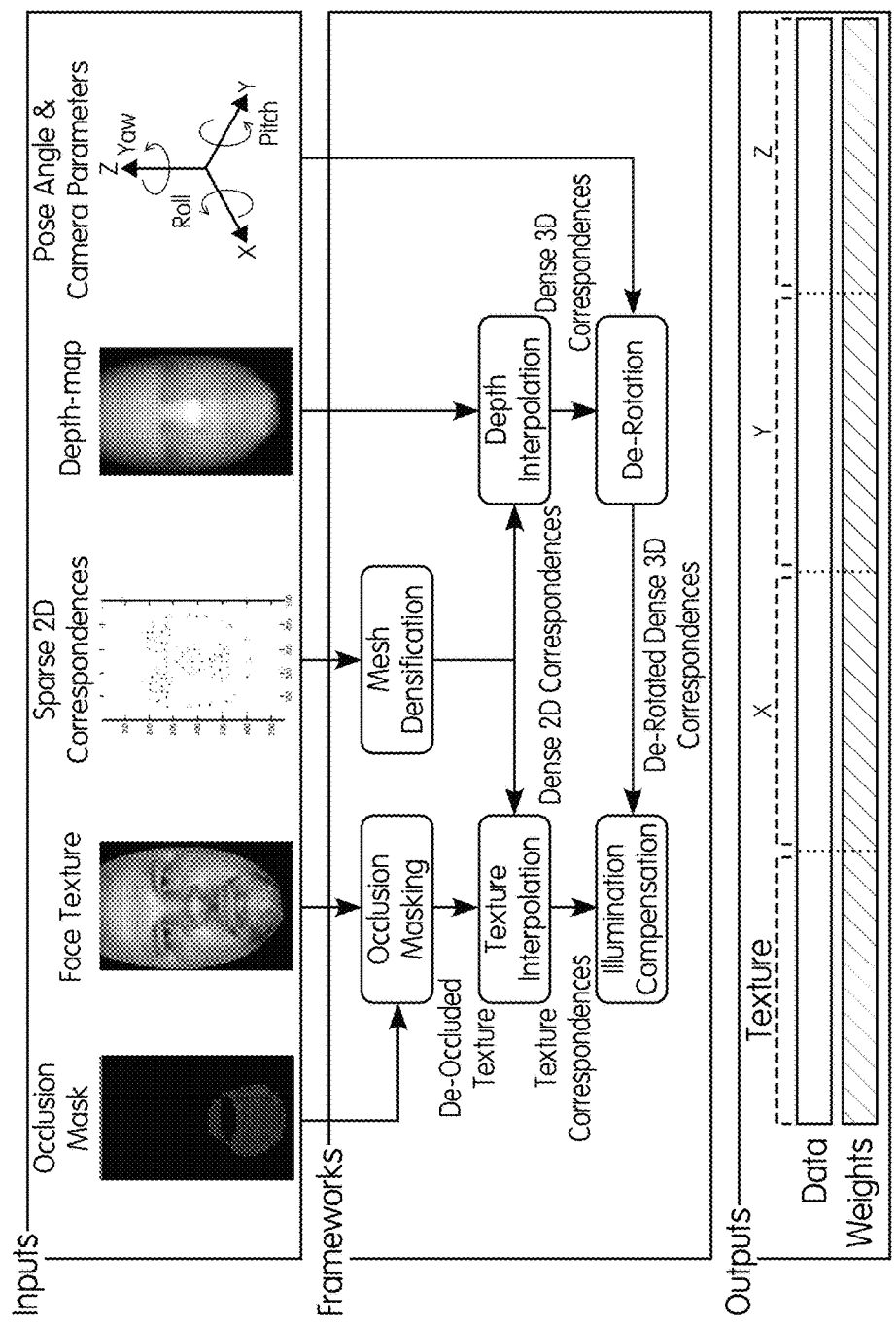
FIG. 26 is a chart of the functions performed by the system described herein.

The inclusion of fiducial points enables the satisfaction of the P1—Consistency property, as described above, as these fiducial points represent sparse correspondences between the faces. However, to satisfy the P2—Completeness property, requires dense correspondences across the faces, in both 2D and 3D. This is accomplished by generating a dense correspondence mesh between faces, using the sparse correspondences provided by the fiducial points. The result of the mesh densification process can then be used to recover degradations due to several causes, as shown in FIG. 26.

To overcome limitations of prior-art subdivision-based techniques, a new refinement technique is proposed herein using interpolating splines. As with the subdivision approach, this approach begins with the provided fiducial point set of n points. The 2D (x, y) (or 3D (x, y, z)) coordinates of this sparse correspondence set are then used to infer a thin-plate interpolating spline (TPS) function.

Let the 2D sparse image correspondences of a facial surface, as provided by a fiducial point annotation, be represented by the points $(x_i, y_i)$, and let $(\bar{x}_i, \bar{y}_i)$ be the corresponding set of mean 2D coordinates of the fiducial point scheme computed over a database set of such faces. The thin-plate spline solution then allows us to find the smoothest possible real-valued function s which satisfies the interpolation problem $$s(\bar{x}_i, \bar{y}_i) = (x_i, y_i), \forall i = 1, 2, \ldots, 45 \quad (1)$$

i.e. s captures the deviation of the 2D feature points from the mean. The measure of smoothness used in this case is the integral $$I(s_i) = \int\int_{\mathfrak{R}^2} \left(\frac{\partial^s s}{\partial x^2}\right)^2 + 2\left(\frac{\partial^2 s}{\partial x \partial y}\right)^2 + \left(\frac{\partial^2 s}{\partial y^2}\right)^2 dx dy \quad (2)$$

It is important to note that the above penalty function does not penalize linear transformations. For the purposes of this invention, this is of significant advantage, as it is desirable that linear variations such as rotation and scaling do not affect the mesh densification process. The variational problem of minimizing Eq. (2) subject to the interpolation constraints in Eq. (1) has been shown to have a unique solution given by the thin plate spline of the form:

$$s(\bar{x}_i, \bar{y}_i) = a_0 + a_1 x + a_2 y + \Sigma_{i=1}^{45} \lambda_i r_i^2 \log r_i \quad (3)$$

Where $a_0$, $a_1$, $a_2$ represent the rigid deformation coefficients, $\lambda_i$ represents the non-rigid spline de-formation coefficients, and $r_i^2 = (x - x_i)^2 + (y - y_i)^2$. It turns out that, the integral smoothness measure Eq. (2) is finite if and only if the non-rigid coefficients $\lambda_i$ have the properties:

$$\sum_{i=1}^{n} \lambda_i = 0, \sum_{i=1}^{n} \lambda_i x_i = 0, \sum_{i=1}^{n} \lambda_i y_i = 0.$$

An efficient and closed-form technique to determine these coefficients by matrix inversion is known. A set of uniformly distributed points on the mean face is selected, and the computed warping function is used to find the correspondences on the test face.

Figure 2:
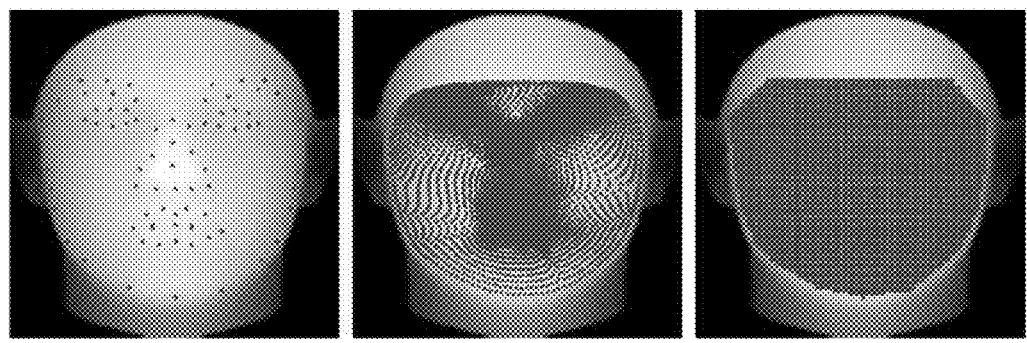
FIG. 2 shows a sample comparison of the vertex distribution of the result of two mesh refinement approaches. (L to R) Original set of 79 fiducial points, Dense set of 4,545 points generated by loop subdivision, comparably dense set of 4,360 points generated by the TPS approach.

The thin plate spline interpolant allows the negative aspects of the dense correspondence surface to be overcome: the resulting vertex set can be selected to be uniformly distributed across the facial surface resulting in a more homogenous representation of the face, achieving a similar overall representation density with fewer vertices. The resulting distributions of the vertices are shown in the rightmost image in FIG. 2. Moreover, the use of the spline-based transformation learning framework enables the technique to be agnostic to the particular landmarking scheme (placement of fiducial points) used, enabling the technique to be used on several face datasets, each of which is provided with different manual annotations.

Cross-Resolution Modeling & Noise Tolerance

Figure 3:
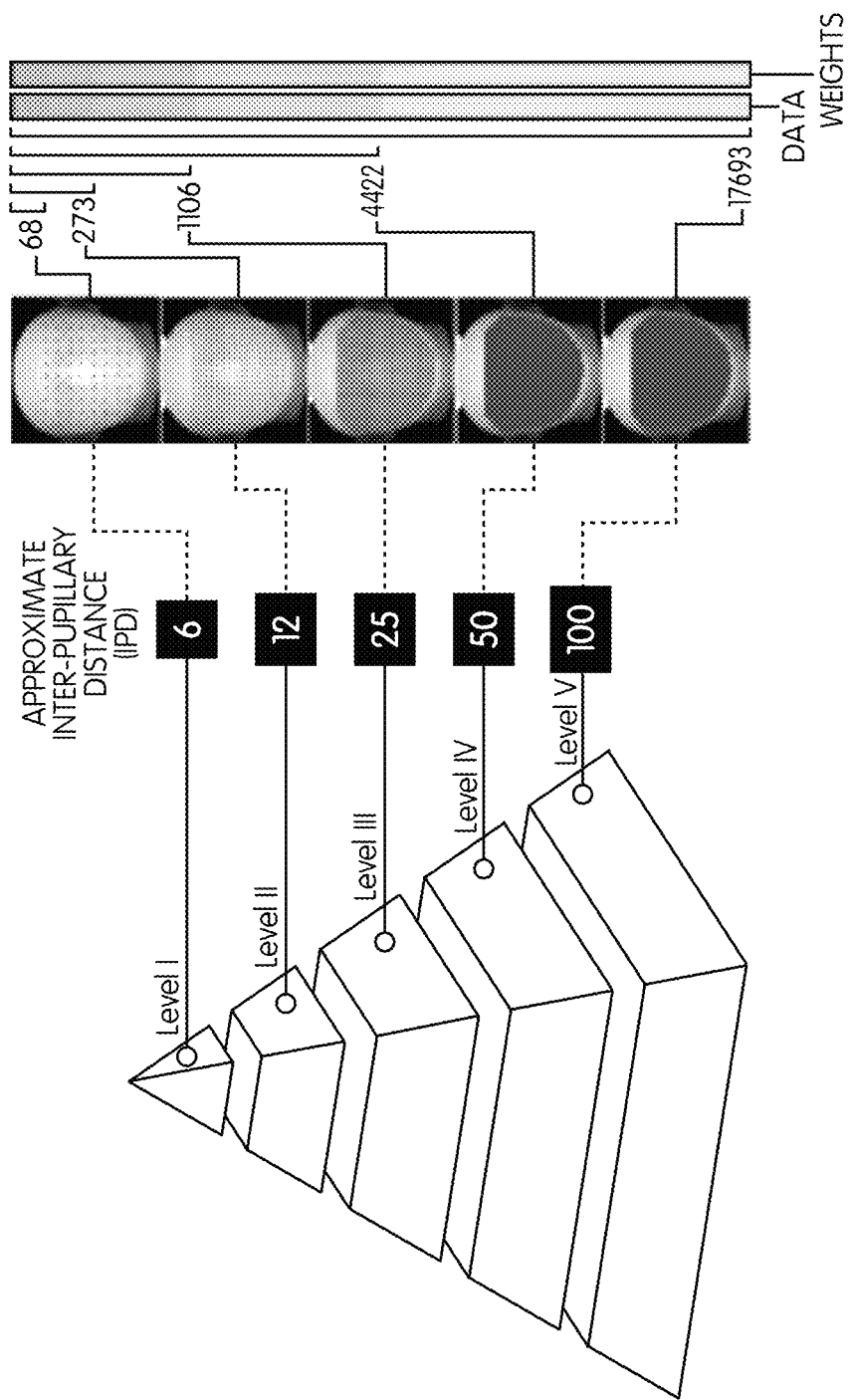
FIG. 3 shows that the proposed multi-resolution modeling framework uses a different grid density based on the inter-pupillary distance (IPD) of the input face. Unsampled vertices are filled in with dummy values and weighted to 0.

A low-resolution image of a face can be approximated as a sub-sampling of the visible pixels in the face image, while the underlying shape of the face is not corrupted. This fact is exploited in embodiments of the invention. The resolution of the input face is estimated by analyzing the inter-pupillary distance (IPD), which can be usually computed from the sparse fiducial points. When presented with a low-resolution image, the appropriate level in the resolution pyramid (See FIG. 3) based on the inter-pupillary distance (IPD) is ascertained, which is computed using the fiducial points on the face. The (correspondingly dense) vertex locations and texture elements (x', y', g'), where x'⊆x, y'⊆y, g'⊆g are then extracted. These elements are incorporated into the data vector, while the complementary set of missing values is set to 0. The corresponding weights of the complementary set of values are also set to 0, as these elements are not visible. Five pyramid levels, as shown in FIG. 3, have been empirically selected, corresponding to IPDs of {<6}, {12}, {25}, {50}, and {~100} pixels.

Figure 4:
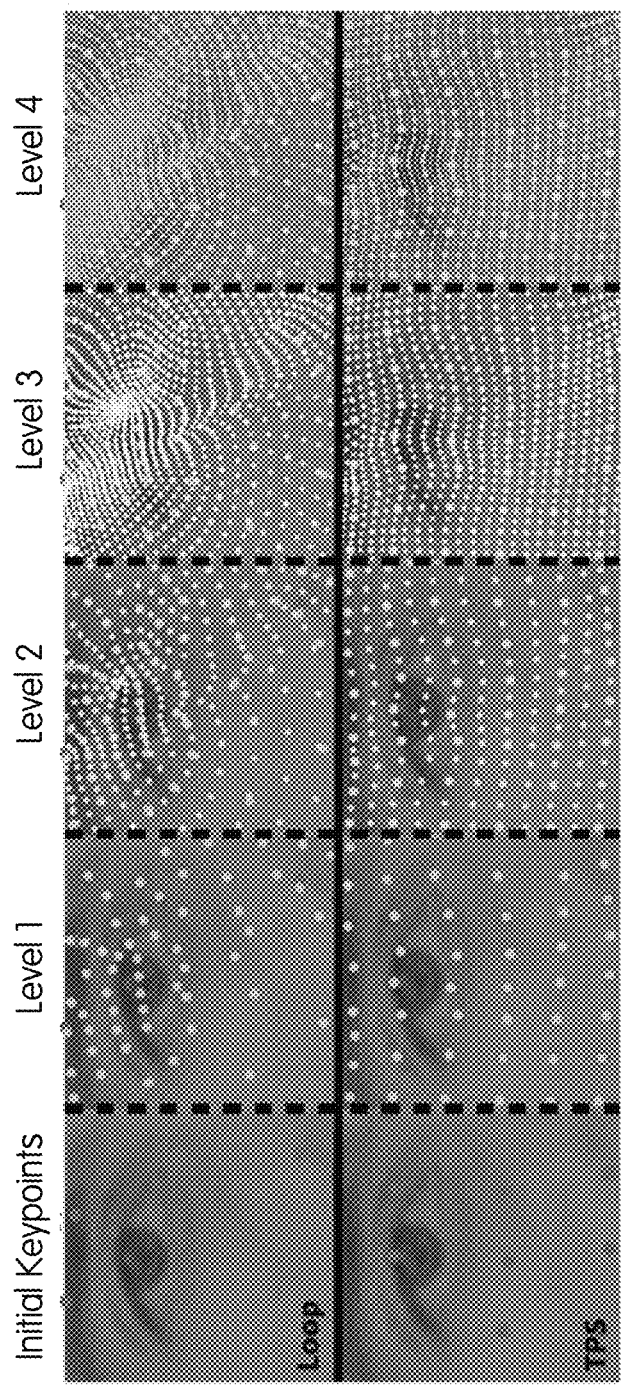
FIG. 4 is a comparison of loop subdivision (above) and TPS (below) based keypoint densification techniques. The figures show results from four levels of iterative densification. It is clear that the TPS technique results in more homogenous and stable keypoints, which enables multi-resolution modeling.

A major advantage of using thin-plate spline based mesh densification over loop subdivision is that it affords the ability to construct a resolution-tolerant model. A progressively denser set of vertices on the face using both techniques can be found. Each iteration of loop subdivision further densies the mesh, and progressively denser uniformly spaced points on the mean face can be located, hence getting many levels of spline-based correspondences. However, loop subdivision tends to dislocate the original fiducial points, whereas in the TPS technique, the vertices do not move. The result is that the TPS vertices in each iteration (i.e. each lower pyramid level, as shown in FIG. 3) is a superset of those in the immediately preceding iteration, as shown in FIG. 4.

Disassociation of Structure & Texture

Acquisition degradations may affect both shape and texture of a face in different ways. However, certain degradations (e.g. illumination, occlusions) affect only textural elements of the representation, while certain others (such as projection onto frontal 2D image) may affect only structural elements, leaving the texture of the face unchanged. Yet other degradations, such as images captured with 3D pose, affect both acquired structure of the face as well as the texture, since some parts of the face suffer from self-occlusions. It is therefore clear that the model space must be designed such that textural and structural components of the face are disassociated.

As our representation for the face, we concatenate the structural details represented in the 3D vertex coordinates (x, y, z) of each corresponding vertex on the face along with the textural details represented by the grayscale value g interpolated at that vertex. Our resulting representation for each face is a measurement vector $m = [x^T y^T z^T g^T]^T$, where x, y, z represent column vectors containing the x, y, z coordinates of n vertices respectively and g is a column vector containing the corresponding texture indices. We also maintain another vector $w = [w_x^T w_y^T w_z^T w_g^T]$ equal length as m, which contains the observation confidence (a value between 0 and 1) of each of the corresponding measurements in m. If a particular measurement is not available due to a degradation, it is filled with a placeholder value, and the corresponding entry of w is set to 0. The methods used to compute these confidences are based on the type, degree and measurement of the degradation, the details of which are described in the next section.

Predicting the Impact of Degradation

In this section the extent to which the proposed face representation is able to satisfy the P3 Predictable Impact Under Degradation property described above is analyzed. To satisfy this property, for all the degradations considered, the representation should demonstrate a local, measurable and accumulative impact.

The observations x, y, z and g are directly measured from the input. For the relatively uncomplicated case of a perfect 3D model observation under zero degradation and accurate landmarks, the face is first aligned using the landmarks, the TPS-derived dense correspondences are computed, and the locations and grayscale texture values at the dense correspondence vertices are extracted.

2D Projection & Pose-Induced Self-Occlusions

Perhaps the most commonly observed type of degradation that is that induced by projection of the 3D face onto a 2D image plane, such as when observed by a standard camera. The orientation of the camera with respect to the face determines the 3D pose angle of the observed face. Real-world images are seldom frontal mugshots. Rather, there is a significant 3D pose variation observed (i.e. rotation in pitch $\theta$, yaw $\emptyset$ and $\psi$ roll, as shown in FIG. 5).

The input image is first aligned using the facial landmarks to eradicate the effects of scaling, translation and roll $\psi$. The dense facial correspondence locations are then obtained using the TPS technique, and the values of (x, y and g) are measured. The image formation model can be depicted using homogenous coordinates as:

$$\begin{bmatrix} x'^T \\ y'^T \end{bmatrix} = PR_{(\theta,\emptyset,0)} \begin{bmatrix} x^T \\ y^T \\ z^T \end{bmatrix} \quad (4)$$

for all observed 2D facial correspondences (x', y') in the image, which are modeled by true 3D facial correspondences (x, y, z). P in this case represents a camera projection model, and $R_{(\theta,\emptyset,0)}$ represents a 3D rotation by pitch $\theta$ and $\emptyset$ yaw (and zero roll). The rotation matrix can be decomposed as a product of three independent rotation matrices:

$$R_{(\theta,\emptyset,\psi)} = R_\theta^p R_\emptyset^u R_\psi^r = \begin{bmatrix} 1 & 0 & 0 \\ 0 & \cos(\theta) & -\sin(\theta) \\ 0 & \sin(\theta) & \cos(\theta) \end{bmatrix} \begin{bmatrix} \cos(\emptyset) & 0 & \sin(\emptyset) \\ 0 & 1 & 0 \\ -\sin(\emptyset) & 0 & \cos(\emptyset) \end{bmatrix} \quad (5)$$

$$\begin{bmatrix} \cos(\psi) & -\sin(\psi) & 0 \\ \sin(\psi) & \cos(\psi) & 0 \\ 0 & 0 & 1 \end{bmatrix}$$

Figure 6:
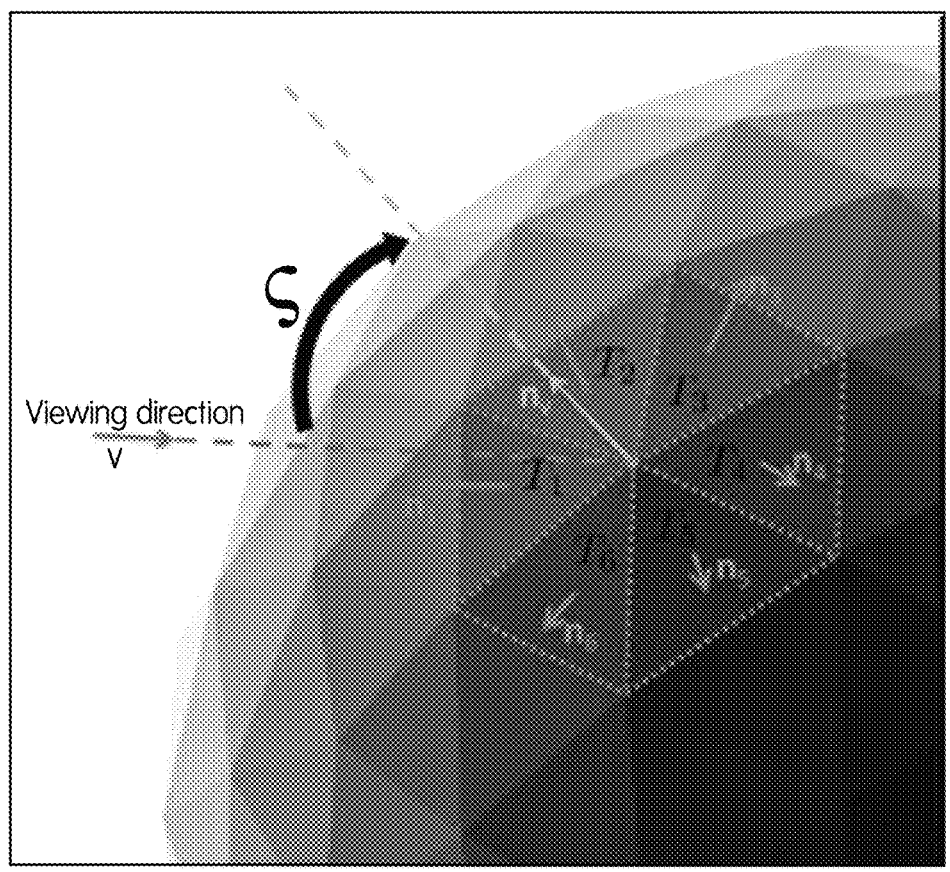
FIG. 6 shows the computation of vertex visibility. Vertex normals are computed as a weighted average of triangle facet normals. The angle between viewing direction and the vertex normal provides a cue towards vertex visibility.

Assume that the degradation is measured accurately, i.e. the values of $\theta$ and $\emptyset$ are known. This could be either manually provided, or estimated using a commercial pose estimation engine. Assume the roll angle $\psi$ is zero since it can be overcome by simple image rotation, $R_\psi^r$ is reduced to the identity matrix. We can further make the "generic depth model" assumption as in 3DGEM. Note that, at this stage, we are not making a depth model assumption for the structure of the face; this is simply being made to determine vertex visibility, as shown in FIG. 6, for observer texture confidence estimation. This gives us a value for z=ẑ (obtained as an average from a set of training data), and also allows us to compute the estimates of the derotated (x, y) as:

$$\begin{bmatrix} x'^T \\ y'^T \end{bmatrix} = \begin{bmatrix} 1 & 0 & 0 \\ 0 & 1 & 0 \end{bmatrix} \begin{bmatrix} 1 & 0 & 0 \\ 0 & \cos(\theta) & -\sin(\theta) \\ 0 & \sin(\theta) & \cos(\theta) \end{bmatrix} \begin{bmatrix} \cos(\emptyset) & 0 & \sin(\emptyset) \\ 0 & 1 & 0 \\ -\sin(\emptyset) & 0 & \cos(\emptyset) \end{bmatrix} \begin{bmatrix} x^T \\ y^T \\ z^T \end{bmatrix} \quad (6)$$

In this case, a simple orthographic camera projection model is assumed. The formulation can be extended to other models as well, provided the intrinsic camera parameters can be estimated for the same. By simplifying this equation, we get:

$$x^T = \frac{x'^T - \hat{z}^T \sin(\emptyset)}{\cos(\emptyset)} \quad (7)$$

$$y^T = \frac{y'^T + \hat{z}^T \sin(\theta)\cos(\emptyset) - x^T \sin(\theta)\sin(\emptyset)}{\cos(\theta)} \quad (8)$$

The grayscale texture values are obtained by simple interpolation of the image, as earlier. The measurement vector m obtained by using this method can be very inaccurate. The underlying "generic depth model" assumption may be a poor approximation of z for certain faces, and this error is amplified with increasing 3D pose angles. Consequently, this may lead to dubious estimates of the underlying (x, y, g) components. While these measurements can hardly be improved (given the conditions of acquisition), it is important to quantify the uncertainty in every single item of the measurement vector. This is exactly what the observation confidence vector w quantifies.

The observation confidences $w_z$ of these measurements is always very low, since the z values are obtained directly from an average estimate. We set these values to 0.1 in our experiments. We find that the confidences $w_x$ and $w_y$ are directly influenced by the pitch and yaw angles. For example, the larger the yaw (pitch) angle, the more erroneous is the estimation of the x (y) component. As the angle reaches 90°, the confidence of measurement should reach 0. A reasonable confidence measure is obtained as a sigmoid relationship between the angle and the confidences:

$$w_x = 1 - (1 + e^{(A_x - |\theta|)/S_x}), \quad w_y = 1 - (e^{(A_y - |\emptyset|)/S_y}) \quad (9)$$

The values of $A_x$=45, $A_y$=30, $S_x$=10, $S_y$=5 are empirically determined.

The observation confidence of texture values $w_g$ is harder to estimate. It is directly related to the confidence with which the dense correspondences obtained at pose angles is obtained, and can easily be thrown off by self-occlusions of the face and hard edges. It has been found that a good approximation of this confidence measure can be obtained by analyzing the visibility of each vertex on the face. Some vertices are occluded due to the pose angle and self-occlusion, whereas others come more into view as the pose varies. Since a "generic depth model" assumption has been made in computing the structure, we can use this information towards computation of vertex visiblilities.

The vertex visibilities are obtained by computing the normal direction n to all triangles which form the mesh of the face. These triangle normals can be computed by taking the cross products of the lines joining any two pairs of vertices of the triangle. The vertex normals themselves can then be computed as a weighted average of the normal directions of the triangles that it belongs to, where the weights are in direct proportion to the area of each triangle. The angle $\zeta$ between the computed vertex normal n and viewing direction v gives us a direct clue towards vertex visibility, which is again obtained as a sigmoid relationship:

$$w_g = 1 - (1 + e^{(A_g - |\zeta|)/S_g}) \quad (10)$$

Figure 7:
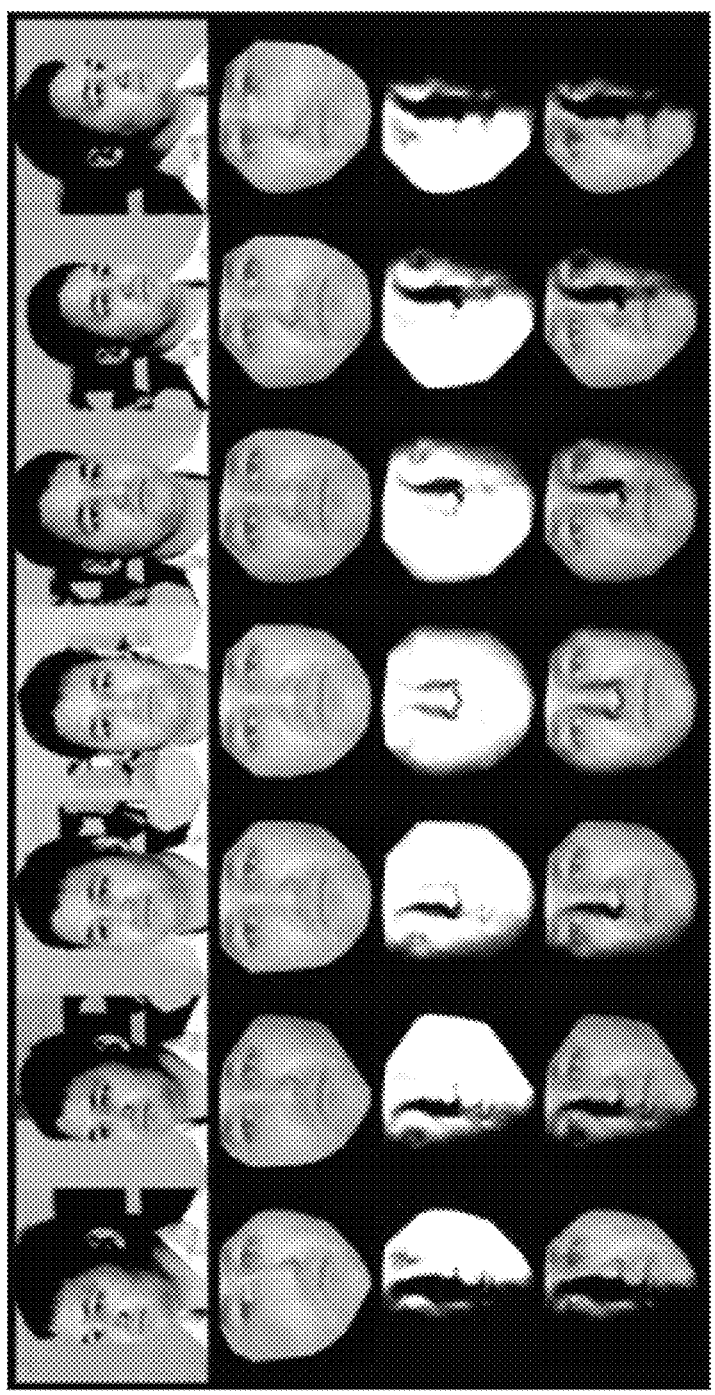
FIG. 7 shows examples of pose normalization & texture visibility. The top row shows sample images from the CMU Multi-PIE database with yaw angles from −45° to +45° in 15° increments. Second, third and fourth rows show pose-normalized 2D images, automatically determined texture confidences (black=0, white=1), and texture scaled by texture confidence for visual analysis respectively.

A pictorial depiction of this process is shown in FIG. 6. Although this results in an inexact estimation of occluded regions, it is sufficiently accurate to ensure that a very small percentage of occluded correspondences are inaccurately labeled, which is our primary requirement. Some examples of the resulting pose-normalized vertices, along with vertex visibility-derived observation confidences, are shown in FIG. 7.

Other Forms of Acquisition Degradation

There are some other forms of acquisition degradation which could be incorporated into the proposed framework, but are either trivial in their adaptation to this representation, or have not been thoroughly investigated by us. We list out a few of these here:

External Partial Occlusions:

Other than self-occlusions of the face due to pose variations previously addressed, external objects very commonly occlude parts of the face. Examples of such occlusions include hair, eyeglasses, sunglasses, scarves, and masks. These are very easily addressed by the technique of the present invention. When provided with an annotation of the occlusion mask, the corresponding textural and structural components in the occluded region are simply weighted to 0, as this information is unavailable from the acquisition. This annotation could be performed in an automated fashion or with manual oversight.

Expression Variations:

Expressions are non-linear deformations of the face, and some basic testing has demonstrated that the spline-based framework is able to adequately deform to most expression variations. Given that severe expressions strongly affect structural components of the face, one approach would be to devalue the corresponding structural data by de-weighting. Certain expressions have a localized impact on the face, leaving other regions unaffected, this could be used as well. Textural details are mostly unaffected.

TABLE 1

Details about the databases used in training the reconstruction system.

| Database | Size | Type | Resolution |
| --- | --- | --- | --- |
| USF HumanID 3D Face Database | 218 | 3D | High |
| Texas 3D Face Recognition Database | 1,149 | 3D | High |
| FRGC v2.0 Database | 34,696 | 2D | High |
| Online Mugshots Database | 1,000 | 2D | Medium |

Aging:

It is yet unclear how aging of the face would affect structural and textural details. The lack of sufficient aging data and inadequacy of prior research in this area makes it an interesting, but challenging problem.

Face Modification:

As of the time of this writing, there is sparse research on how facial structure modifications, such as plastic surgery, or texture modifications, such as tattoos, marks and scars, could impact facial recognition performance. One possible approach to handle these using our system would be to lower the weights/measurement confidences of structural and textural components appropriately.

Recovery Techniques

The training data used in this invention contains approximately 37,000 data items obtained from four different databases, outlined in Table 1. All of the training data used was manually annotated with the locations of 79 predefined fiducial points, following a well-known fiducial point scheme. Several independent schemes of this type are found in literature; it is to be noted that our representation model is largely agnostic to the scheme used, as long as the spline model is made aware of the point definitions on a mean face model. The dimensionality of our representation is 70,772 (consisting of grayscale texture, x, y, and z coordinates of 17,693 unique vertices on each face). This data was sued to construct two linear bases: a principal component basis which is used for $l_2$ recovery and a K-SVD basis which is used for $l_1$ recovery.

Real-World Applications in Single-Face Degradation Problems

To demonstrate the effectiveness of the present invention, several experiments were conducted on both controlled datasets and real-world captures, and accuracy results were demonstrated for several recovery problems as well as recognition problems. The focus of this chapter is to completely characterize the system performance under single degradation conditions, as well as simulated and actual real-world conditions. In several cases, we demonstrate visual recovery results, so the output of our technique can be used as a pre-processing engine to assist manual analysis and several commercial techniques as well.

The primary goal of the system disclosed herein is to study the feasibility of implementing an end-to-end face recognition engine for real-world scenarios. We envision applications where enrollment of subjects is through frontal, neutral light and expressionless images (i.e. typical enrollment images for most applications), but test images come from real-world unconstrained scenarios. Our technique is also targeted at user-assisted cases, for example, analyst-driven post-event investigations at law enforcement agencies, where degraded facial capture is inevitable. This is a common occurrence, with agencies such as the New York Police Department (NYPD) and Pinellas County Sherriff's Office (PCSO) setting up investigative departments with the principal focus of facial analysis. Many such cases involve multiple simultaneous degradations, limiting the use of currently available methods, however analyst-generated information can be used to assist automated techniques. Hence, we evaluate several of these techniques along with manually-provided facial annotations, and also demonstrate the sensitivity to noisy annotations.

We examine three different aspects of each type of signal recovery technique: (a) Accuracy of the signal recovery (as measured by visual evaluation of the reconstruction of the face), (b) Robustness of the recovery coefficients (as measured by recognition performance under the observed degradation), and (c) Stability of the coefficients to varying levels of noise in the input. Since facial images originally lie in a very high-dimensional pixel space, it is desirable to represent them in a compact form in lower dimensional feature spaces for recognition. In all cases, we evaluate two data representations for recognition: a weighted $l_2$ projected coefficient vector on the principal-component basis (henceforth referred to as "WGHA"), shown in FIG. 24, and a weighted $l_1$-fit coefficient vector on the K-SVD constructed basis (henceforth referred to as "WK-SVD"), shown in FIG. 25. The principal component basis we trained contains 5000 basis vectors, while the K-SVD basis contains 1000 basis vectors. All training was conducted on a 64-core server with 512 GB of RAM, using an optimized MATLAB® implementation. The procedure for weighted $l_1$ and $l_2$ projection was also coded in MATLAB®, but utilized the gpuArray functionality which greatly improved computational performance, using NVidia R GPU cards. The WGHA and WK-SVD algorithms are shown in FIGS. 24 and 25 respectively For matching (i.e. computing a distance measure between) pairs of these coefficients, we attempted three popular schemes: (a) direct Normalized Cosine Similarity ("Cosine"), (b) Large Margin Nearest Neighbor ("LMNN"), and (c) Class-Dependent Feature Analysis ("CFA"). Of these, the Cosine distance metric is completely unsupervised, being defined as:

$$D(c_1, c_2) = 1 - \frac{c_1^T c_2}{\|c_1\|\|c_2\|} \quad (11)$$

The latter two distance metrics (LMNN and CFA) are supervised techniques, which are trained using the same data as used in the basis construction.

It should be noted that none of the images, subjects, or even databases used in this chapter for testing, were used in training the subspaces. The training data used is outlined in Table 1. This demonstrates the true generalization capability of the system.

3D Pose-Induced Degradation

Most face gallery databases (such as passport photos and DMV photos databases) consist of frontal or near-frontal faces, and it would be too computationally expensive and time consuming to rotate all faces in the database to match the viewpoint of a query image of an arbitrary angle. Instead, we argue that it is more efficient to leave the gallery unperturbed and process the query image to correct its pose back to frontal, where more face features are visible. We refer to this as "pose correction", a problem which requires the estimation of corrected frontal face structure, as well as self-occluded textural details.

We primarily test the pose tolerance of our technique on the popular CMU Multi-PIE database, which includes faces captured under controlled, measured conditions with significant yaw variation, although pitch variations are limited. We use a subset of the Multi-PIE database, containing a single frontal illumination (07) and neutral expression of each of the 337 unique subjects. Currently, for pose correction, we limit our method to handle the left 45° to right 45° range. This range guarantees that we observe sufficient facial information to enable reliable manual or automatic fiducial point localization on the face. Initially, we demonstrate performance using manually annotated fiducial points on the face, as well as database-specified pose estimates. For a complete characterization, we also run several sensitivity analyses to show performance degradation with noisy input information.

Pose Correction

Figure 8:
FIG. 8 shows sample images from the CMU Multi-PIE database demonstrating the facial pose correction capability. Three example subjects are shown, for each subject the top row is the input image (L to R, 45° to +45° in 15° increments), middle row (outlined in blue) is the WGHA recovered 21 image, and the bottom row (outlined in red) is the WK-SVD recovered image.

The pose correction problem (also called the frontalization problem) is the recovery of a frontal-viewpoint rendering of the face, given an off-pose image. To correct the pose of a face, we provide 79 manually annotated fiducial points (see leftmost image in FIG. 2) and an estimate of the facial pose, i.e. yaw, pitch and roll angles in degrees. Using this information, we compute the representation of each image, recover the missing or degraded components, and then work back to render a frontalized face with a yaw angle of 0°. FIG. 8 demonstrates some examples of pose correction by this technique on the Multi-PIE database. While certain instability artifacts are visible using the WGHA technique, we can see that the synthesized WK-SVD images seem to be remarkably accurate as well as stable in the recovered detail of both structure as well as texture across the wide range of poses.

Pose-Invariant Face Recognition

Ideally, the coefficients extracted for a single subject should remain invariant across different poses, and hence provide reliable identity features. A good metric of this is recognition performance across pose, for which we construct an experiment, wherein the gallery (or target) consists of a single frontal image of each of the 337 subjects, and the probe (or query) images are of various non-frontal poses. As mentioned previously, we use three different matching techniques on the extracted coefficients: Cosine, LMNN and CFA. As is the usual practice, when matching with the coefficients of the WGHA subspace, we ignore the first three coefficients, which represent the three primary eigenfaces, since these are dominated by ambient illumination and hence do not provide significant discrimination ability.

Figure 9:
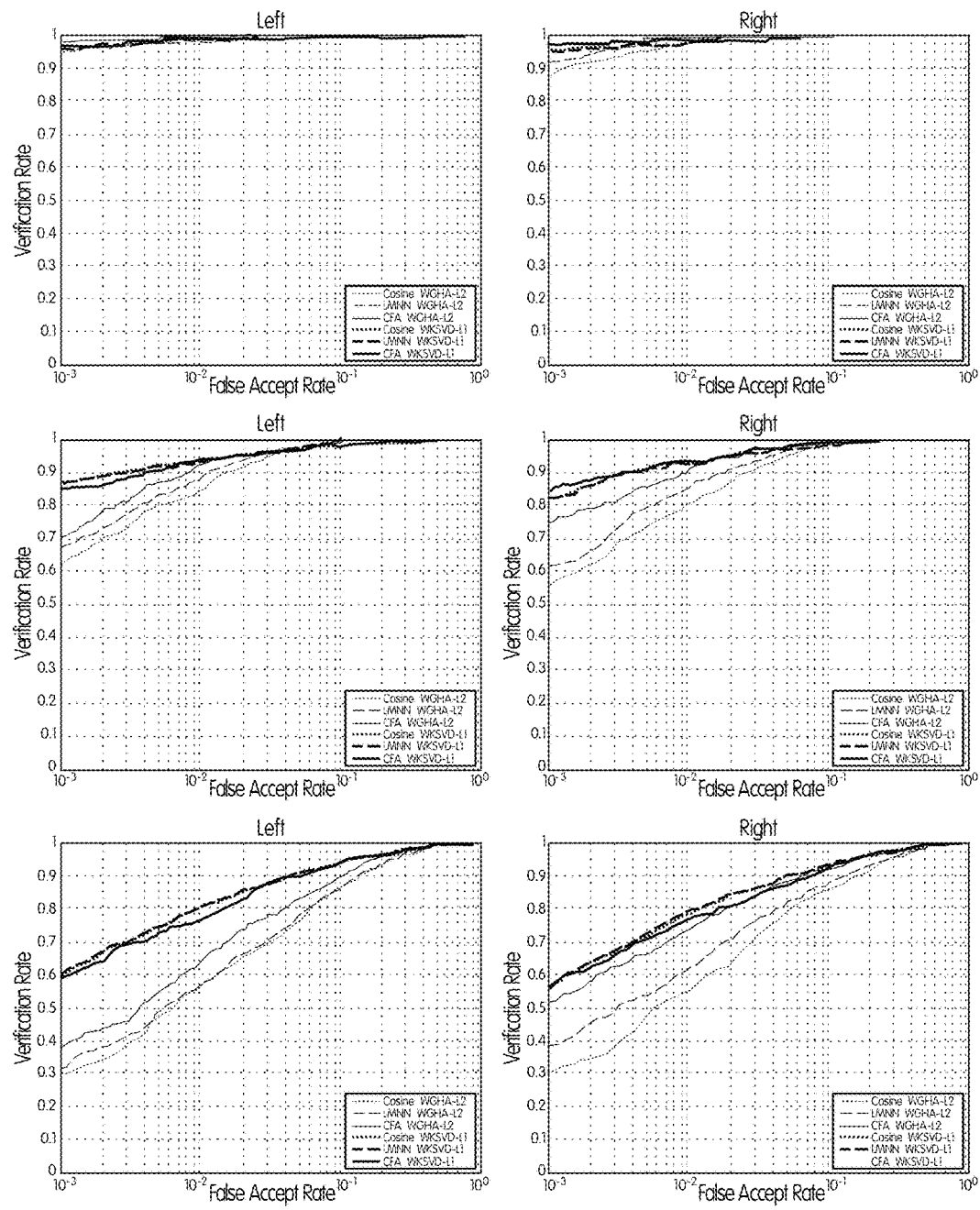
FIG. 9 shows Receiver Operating Characteristic (ROC) curves depicting performance of the pose invariant coefficient feature extraction for recognition using the CMU Multi-PIE database. Six pose angles are used for probe, and we evaluate three matching techniques (Cosine, LMNN, CFA) on two feature sets (WGHA, WK-SVD).

The Receiver Operating Characteristic (ROC) curves from the recognition experiment are demonstrated in FIG. 9 for the Multi-PIE database. Some trends in the results are immediately evident: (a) Recognition performance is remarkably high, with verification rate (VR) at around 60% for a false-accept rate (FAR) of 0.1% when the pose of the input probe face is 45°. This indicates that the coefficients are sufficiently stable as well as discriminative for recognition. (b) The WK-SVD technique outperforms the WGHA technique at significant pose variations, this is also evident in the stability of reconstructions as seen earlier in FIG. 8. (c) In general, the CFA and LMNN matching techniques outperform Cosine distance, with CFA gaining a slight advantage. The Cosine distance metric performs the worst, partly due to its simplicity in formulation and unsupervised nature.

Sensitivity Experiments

The recognition performance results demonstrate the performance of the system in the semi-automated case, since we make the important assumptions of accurate fiducial points and pose angle estimates, for which we use manual assistance. These assumptions are often unrealistic in the fully automated case, so we expect the performance to degrade with increasing levels of variation in these estimates. We perform several experiments to evaluate the relative impact on the recognition performance.

Sensitivity to Landmarking Errors

Figure 10:
FIG. 10 shows empirically determined error ellipses depicting the uncertainty in localization for each fiducial point. The ellipses specified show 0.25, 0.5, 0.75 and 1 standard deviation from the mean, drawn as green, cyan, blue and black ellipses respectively. Mean positions are depicted as red points for reference.

Accurate measurement of landmarking sensitivity is non-trivial, due to the nature of the face structure, self-occlusions caused by 3D pose, and ambiguities in definitions of the landmark positions themselves. Most landmarking schemes contain a few fully defined points, along with several pseudo-landmarks (defined relative to face attributes) and semi-landmarks (defined relative to other landmarks). Automated facial landmarking is oftentimes a complex multi-resolution problem that is constrained by the concept of legal face shape. Therefore, adding random noise to the landmark coordinates is a not representative of real world test scenarios, since random motion of landmark points are unlikely to happen. Instead, we perform a more realistic study based on a simple predicate: all automated landmarking techniques are trained using manually annotated landmarks. We therefore obtained a small dataset of faces which were independently landmarked by several persons. We use this data to approximate the uncertainty of each fiducial point, as captured by the covariance matrix induced by this data. This measurement allows us to incrementally add data-driven gaussian noise to the fiducial points, and thereby study the impact on recognition performance. The estimated covariance error ellipses and examples of noisy fiducial points are shown in FIG. 10.

Figure 11:
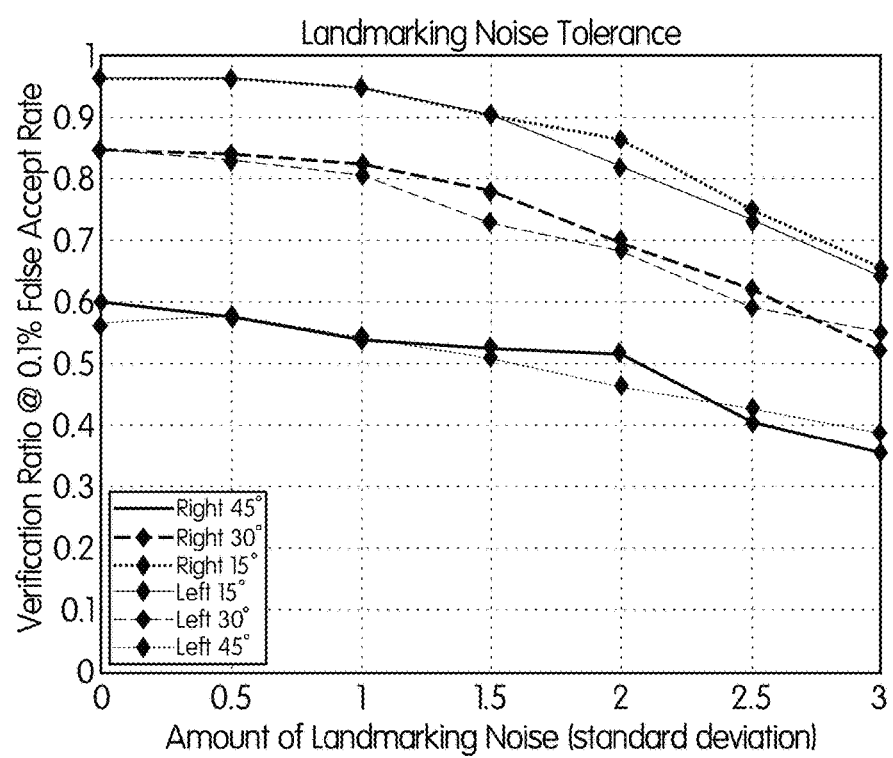
FIG. 11 shows verification rates at 0.1% False Accept Rate at of the WK-SVD technique for increasing levels of landmarking noise added to manually annotated images in the CMU Multi-PIE database.

We measure the sensitivity of the technique to errors in fiducial points by observing the degradation in recognition performance as the amount of noise is increased. We add up to 3 standard deviations ($\sigma$) of noise in steps of 0.5 $\sigma$ to the manually annotated landmarks. As evident in FIG. 10, 3 cr is significantly lower performance than most well-trained automated landmarking systems today. For this recognition test, the target gallery is set up exactly as earlier, but the probe fiducial points are subject to varying noise levels. The results in FIG. 11 provide a concise overview of the degradation in performance, as measured by the reduction in verification rate (VR) at 0.1% false accept rate (FAR). Critically, the performance of the technique degrades marginally and gracefully with increasing levels of noise.

Sensitivity to Pose Angle Estimation Errors

Figure 12:
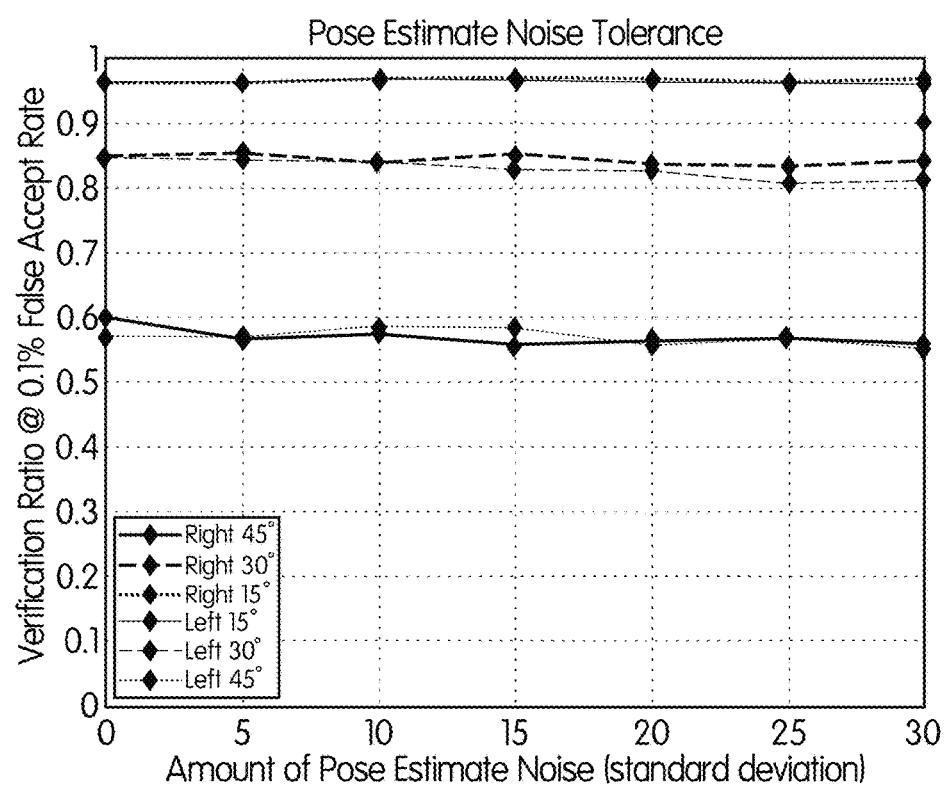
FIG. 12 shows verification rates at 0.1% False Accept Rate of the WK-SVD technique for increasing levels of pose estimation noise added to manually annotated images in the CMU Multi-PIE database.

Pose estimation of the face is generally a less significant issue than landmarking errors, due to both the accuracy of several pose estimation techniques as well as the limited impact that the pose estimation induces on the system. Addition of increasing levels of noise to the pose estimate does not seem to have a significantly large impact on the performance of the system from a recognition perspective, although synthesized faces are distorted. We tested variations in pose estimate of up to 30° in yaw, on images from the CMU Multi-PIE database, with a similar setup as earlier. The trends of recognition performance are shown in FIG. 12. As evidenced by these results, the system is extremely tolerant to these variations.

Occlusion Recovery

The automated removal & context-specific inpainting of faces with natural-looking, yet discriminative features, is a difficult problem. A technique that can accomplish this may provide many advantages. It allows for better visual recognition, and also enables traditional, high-performance automated face recognition techniques to be used on partially occluded faces, thereby adding extended functionality to them.

Figure 13:
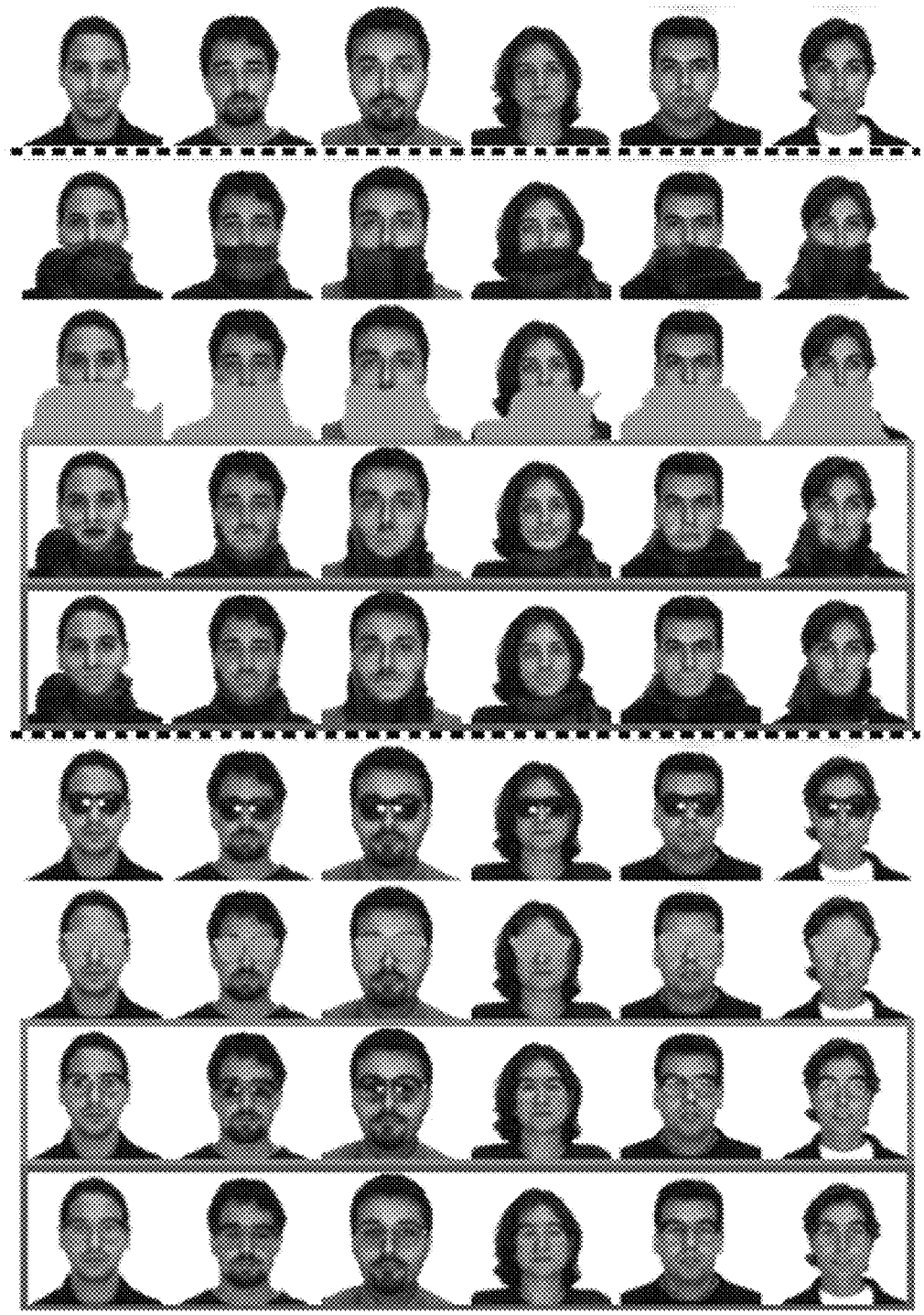
FIG. 13 shows sample images from the AR Face database demonstrating the partial occlusion recovery capability. Six example subjects are shown, for each subject the top row is the un-occluded image. The next four rows show the images showing scarf occlusion, manually annotated occlusion masks, and two rows of corresponding results. The same is repeated for the images showing sunglasses occlusion. The results outlined in blue are the WGHA recovered images, while those outlined in red are the WK-SVD recovered images.

To recover the occluded textural details, our technique requires an occlusion mask, so that corresponding texture and structure components can be ignored during the recovery stage. We manually annotate these masks on the AR Face database, by providing several masked and unmasked seed points for a segmentation algorithm. Fiducial points in occluded regions of the face are manually approximated as well, although several techniques exist to do this. Once recovered, we can blend the face back into the original image. The input images, mask annotations, and recovered results are shown in FIG. 13. As is evident from these results, the instability problems continue to plague the WGHA technique, although the WK-SVD technique seems to provide remarkable accurate and life-like reconstructions, which is impressive considering the scope of the occlusions.

Partial Occlusion-Tolerant Face Recognition

Figure 14:
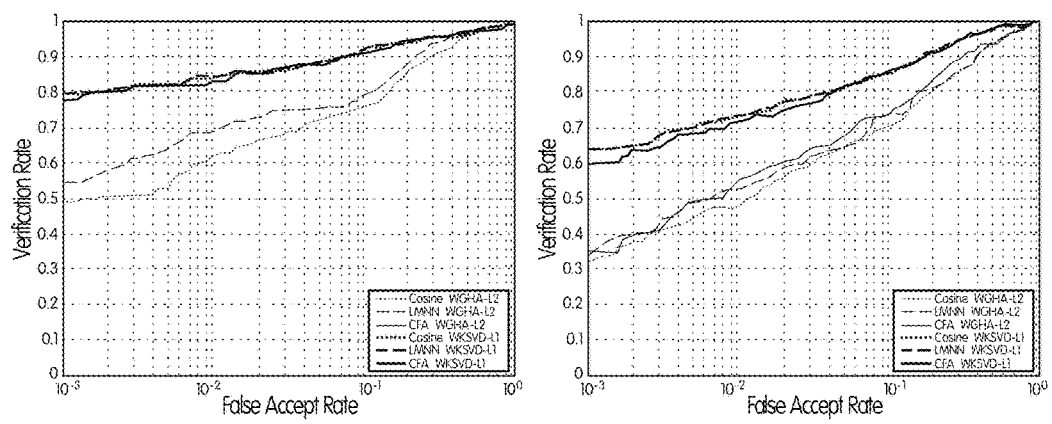
FIG. 14 shows Receiver Operating Characteristic (ROC) curves depicting performance of the partial occlusion-tolerant coefficient feature extraction for recognition using the AR Face database.

When presented with a partially occluded face, we simply ignore textural and structural information that is provided in the occluded region of the face, relying completely on the visible region. Certain parts of the face are well known to be much more discriminative than other parts; the periocular region of the face, in particular, provides strong cues for recognition, while the mouth area is generally considered weak as it suffers from common expression variations. We test two stringent cases, the data for which is provided by the AR Face database: the "Sunglasses" case tests the reliance of our system when the periocular region of the face is occluded, while the "Scarf" experiment demonstrates performance when a larger, lower section of the face is occluded. For each case, we test both coefficient representations (WGHA and WK-SVD), along with all three matching techniques (Cosine, LMNN, CFA). The results from this experiment are shown in FIG. 14. From the outset, it is clear that performance is not degraded severely by the occlusion, and the CFA matching technique employed on the WK-SVD coefficients seem to once again outperform other methods.

Sensitivity Experiments

While the recognition performance is encouraging, they also make assumptions of accurate landmarks in the un-occluded region of the face and an occlusion mask which does not err towards annotation of any occluded region as un-occluded. Moreover, we would like to obtain a more clear understanding of the performance degradation with increasing levels of occlusion. In this section we conduct experiments for these cases.

Sensitivity to Landmarking Error

Automatic landmarking in the presence of occlusions is a non-trivial task. Several techniques have been employed to address this problem in literature with varying levels of success. However, it is yet considered to be an open problem in the field.

Figure 15:
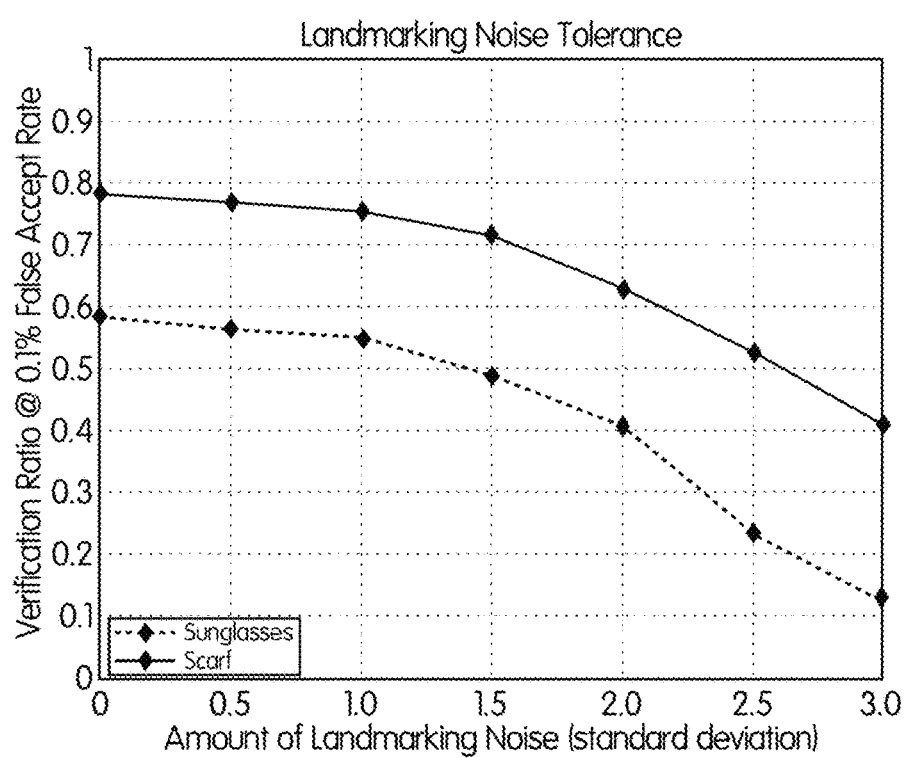
FIG. 15 shows verification rates at 0.1% False Accept Rate at of the WK-SVD technique for increasing levels of landmarking noise added to manually annotated images in the AR Face database.

We incrementally add landmarking errors to the manually annotated landmarks for our sensitivity test, up to 3 standard deviations ($\sigma$) of noise in steps of 0.5 $\sigma$. A concise performance trend is shown in FIG. 15. Once again, we see graceful performance degradation with incremental amounts of noise, which we interpret as an encouraging sign which characterizes stability and reliability of the system.

Sensitivity to Occlusion Size

Undoubtedly, the larger the fraction of occluded facial area, the lesser is the amount of information that is available to the system for accurate facial reconstruction. We expect the reconstruction and recognition performance of the system to degrade with increasing levels of facial occlusion—at the extreme end where all of the face is occluded, our system returns an average face with no discriminating characteristics. Critically, we expect this degradation to be gradual and steady, without a conspicuous knee point of failure.

Figure 16:
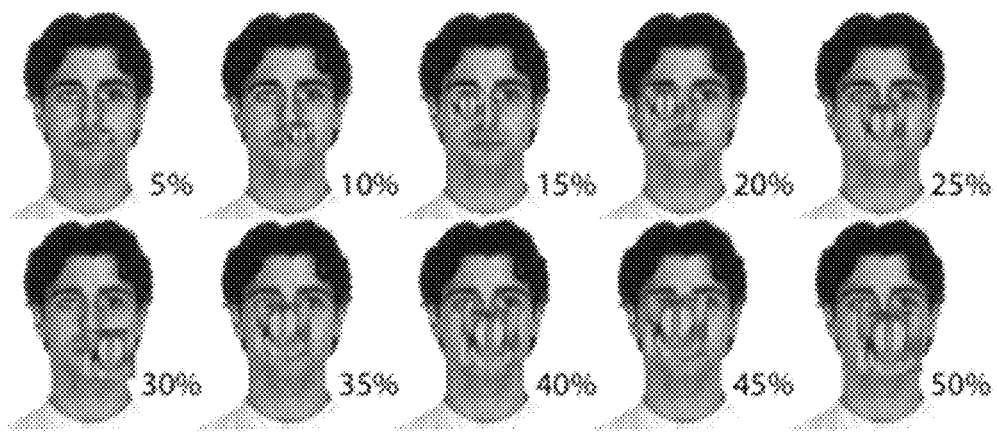
FIG. 16 shows synthesized images of a single subject in the AR Face database, with increasing size of artificial occlusion.
Figure 17:
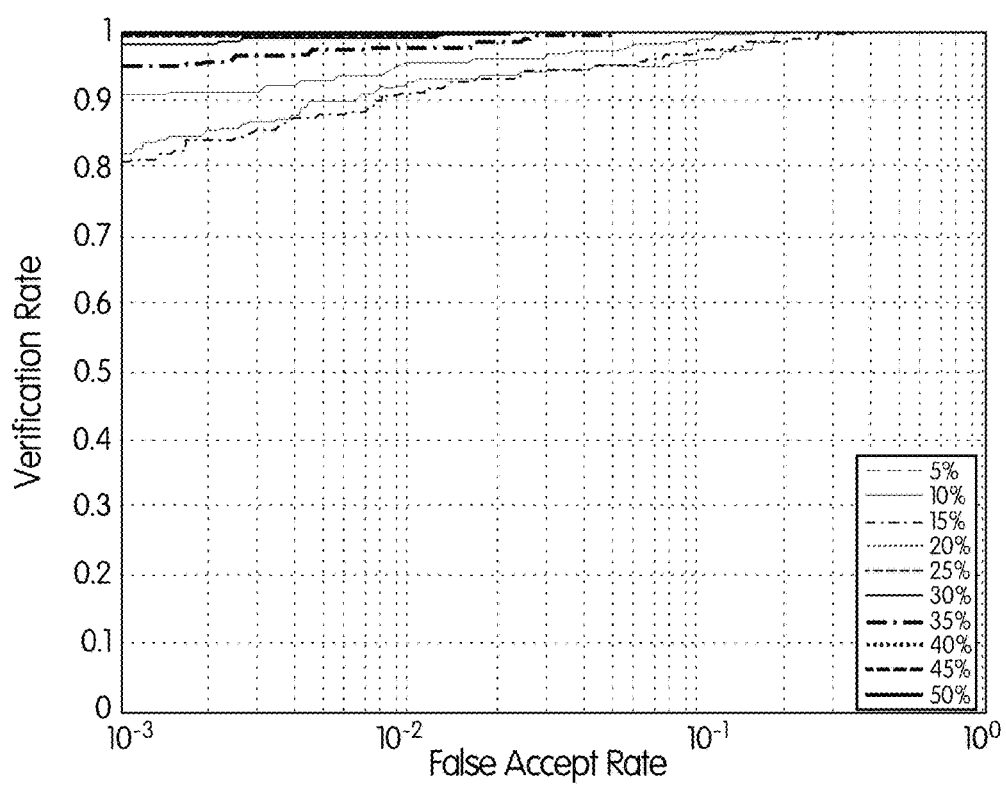
FIG. 17 shows Receiver Operating Characteristic (ROC) curves depicting performance of the WK-SVD technique for increasing levels of artificial occlusion added to manually annotated images in the AR Face database.

To test this characteristic, we synthesized several images of each subject in the AR Face database, but incrementally occluding larger facial regions (5% to 50% of facial area, in increments of 5%) with a natural image, as seen in FIG. 16. Accurate landmarks and occlusion masks were provided to the system. As a measure of stability of the inferred WK-SVD coefficients, we perform a recognition experiment with the gallery consisting of the original un-occluded images, and probe containing the occluded ones. The ROC curves in FIG. 17 demonstrate gradual, stable deterioration of the performance, indicating that the extracted coefficients are not severely corrupted due to the lack of information.

Handling Low-Resolution Images

Low-Resolution images are ubiquitous due to the positioning of imaging sensors, cost and physical limitations. There are typically two traditional approaches at dealing with such images: (a) super-resolution to generate a high-resolution image, which can then be used for matching, or (b) resolution-tolerant feature extraction. In this section we test the performance of our system at both.

Image Super-Resolution

The original images provided in the CMU Multi-PIE database are large, with inter-ocular distance (IOD) of 70 pixels, or larger, which can be considered to fall within the purview of high-resolution images for most facial analysis tasks. Mugshots, Driver Licenses, Passports, and other facial databases also have similar scales of acquisition. Our resolution-tolerant framework enables us to extract stable features under several degrees of face size, from which we can synthesize high resolution face details.

Figure 18:
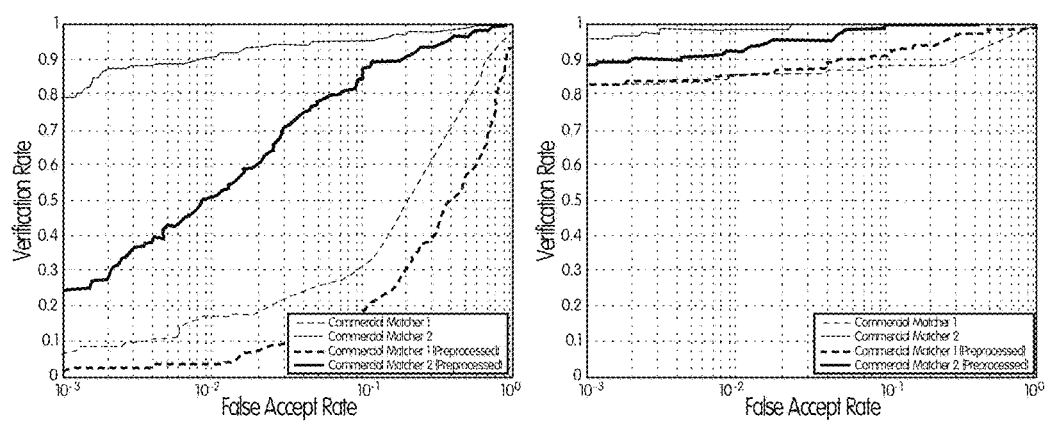
FIG. 18 shows Receiver Operating Characteristic (ROC) curves showing improvements in performance of two commercial face recognition systems for recognition using the AR Face database, when pre-processed by the occlusion removal technique.

Previous work has shown that face recognition performance degrades gracefully with lowering resolution, but suffers a sudden and severe loss in performance at approximately 12 pixels of inter-pupillary distance (IPD). We tested the low-resolution tolerance by synthesizing multiple images for the frontal capture of each subject in the CMU Multi-PIE database, by downsampling the images (in a Gaussian pyramid fashion) to obtain target IPD measures of 12, 10, 8, 6, 5, and 4 pixels. In our experience, this reflects the range of real-world images captured by typical surveillance cameras and other similar distance-imaging systems. These inputs are then processed using the WK-SVD and WGHA systems, followed by a re-synthesis of a high-resolution image. A few synthesis results from this experiment are shown in FIG. 18.

Face super-resolution techniques are often criticized for not being able to reconstruct high-frequency facial details such as edges, creases, etc. We find that our spline-based dense correspondence representation is able to accommodate these subtle aspects, resulting in accurate, natural recovered images. While the WGHA technique demonstrates certain instabilities at higher resolutions, it recovers reliable representations at extremely low resolutions. The WK-SVD technique does extract more natural images, but has an earlier breaking point, after which is generates mean-face reconstructions.

Face Recognition of Low-Resolution Images

Figure 19:
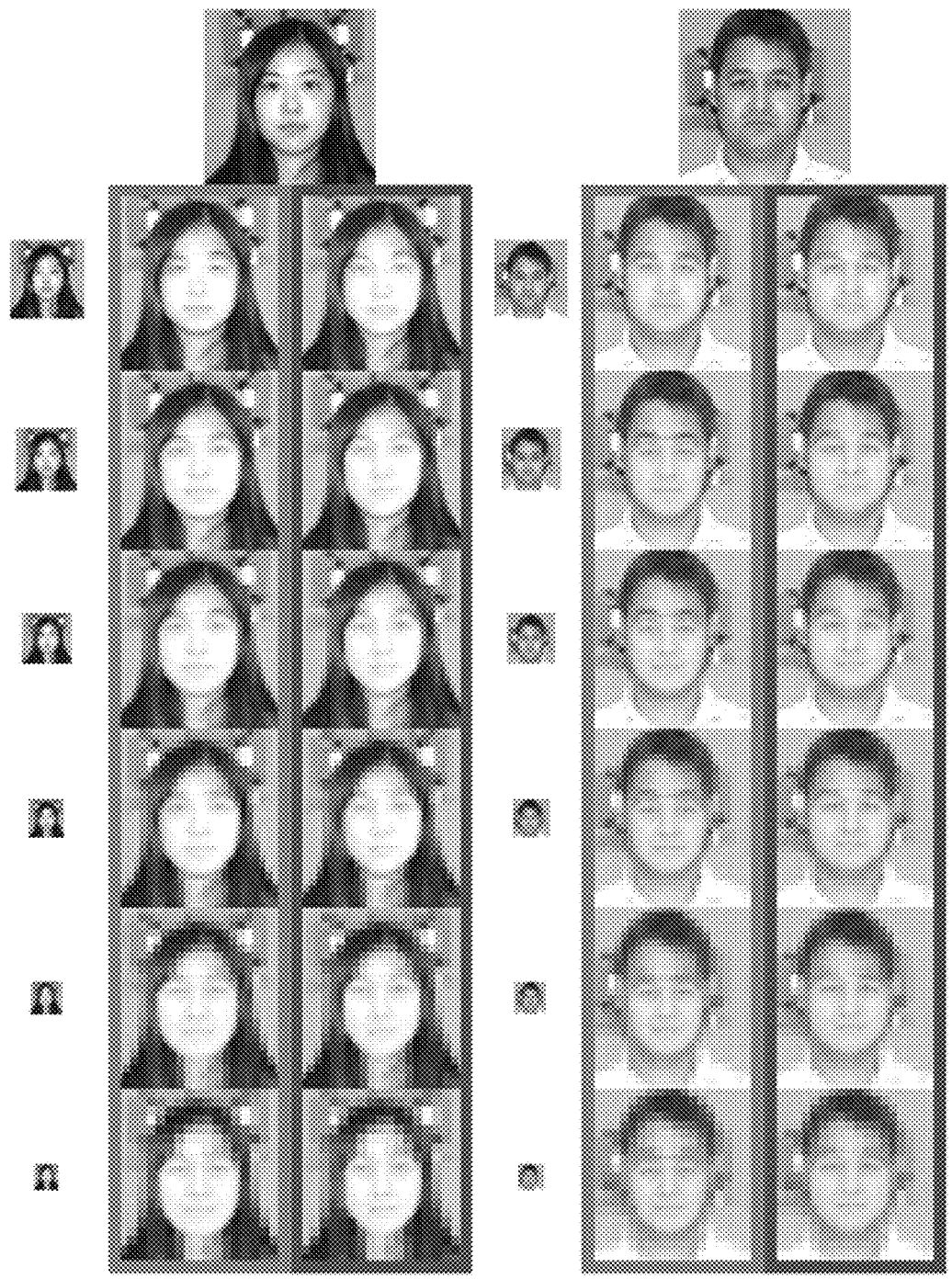
FIG. 19 shows images from the CMU Multi-PIE database demonstrating the facial super-resolution capability on two sample subjects. For each subject the leftmost image is the low-resolution input, followed by super-resolution using the WGHA technique (outlined in blue), and finally the WK-SVD technique (outlined in red). Rows correspond to 12, 10, 8, 6, 5, and 4 pixels of inter-pupillary distance.

When provided with a low-resolution face, we compute our spline-based representation by analyzing the input at the appropriate level of the multi-resolution pyramid shown in FIG. 3. We use the same set of synthesized low-resolution images from the frontal subset of the CMU Multi-PIE dataset as our probe set, shown in FIG. 19, but the gallery contains high-resolution subset of the database, which are images of the same subjects, but captured independently of the pose set. Other than the recognition performance itself, we are particularly interested in the graceful degradation of performance with decreasing levels of query image resolution.

Figure 20:
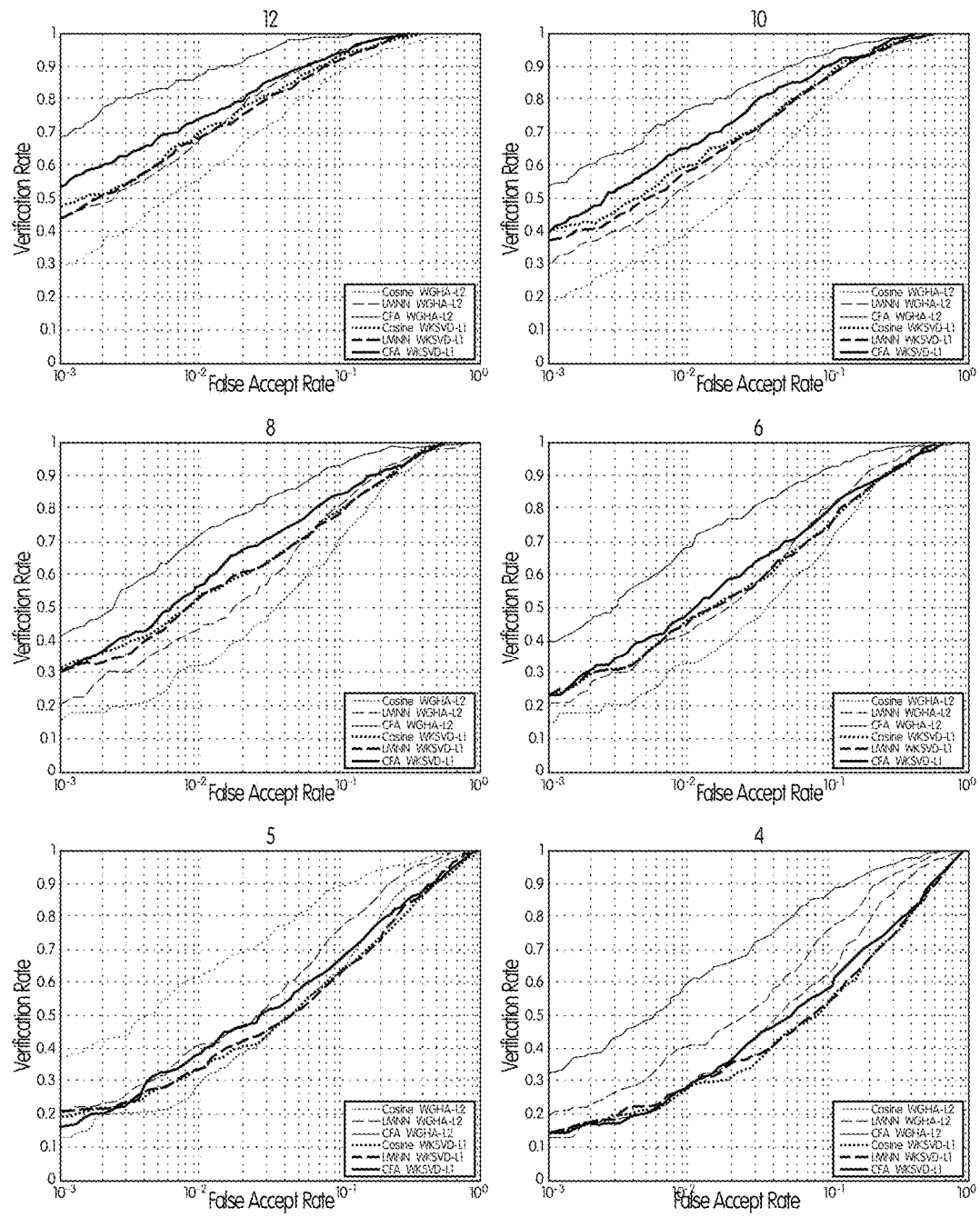
FIG. 20 shows Receiver Operating Characteristic (ROC) curves depicting performance degradation of the WGHA and WK-SVD coefficients for low-resolution input using the CMU Multi-PIE database. The target set is high-resolution part of the dataset.

Our recognition result ROC curves, shown in FIG. 20 demonstrate both of these attributes. Besides, we notice that the WGHA coefficients, along with the CFA matcher, outperform our other efforts, in stark contrast to studies with other degradations, where it was beaten by the WK-SVD technique. This may be in part due to the difference in basis size of the two techniques; the WGHA technique has a basis that is three times the size of that used in the WK-SVD technique. Also, this may also be caused by the fact that the sparse coefficient fitting technique is unstable when presented with such a small amount of data; particularly in the cases with fewer than 6 pixels IPD, where approximately 99.6% of the data in our representation is missing.

Sensitivity Analysis

Low-resolution faces are extremely parsimonious in the amount of visual information content, and can hence be difficult to accurately detect and landmark in scenes. In some cases, several images from the same or different sources may be available to assist these tasks. In practice, human analysts trained in such skills are able to confidently and accurately perform these tasks, and hence their oversight is of crucial value to our approach. For completeness, we study the impact of landmarking errors on low-resolution images.

Sensitivity to Landmarking Error

Automatic landmarking of low-resolution images is often extremely difficult. Most automatic land-marking techniques rely heavily on local patch appearance models to evaluate a goodness-of-fit metric, and the resulting search occurs in sub-pixel ranges. For low-resolution images, these patches may contain insufficient information to reliably discriminate between candidate solutions, leading to ambiguities and errors. It is hence essential that our proposed feature extraction be tolerant to significant levels of landmarking error.

Figure 21:
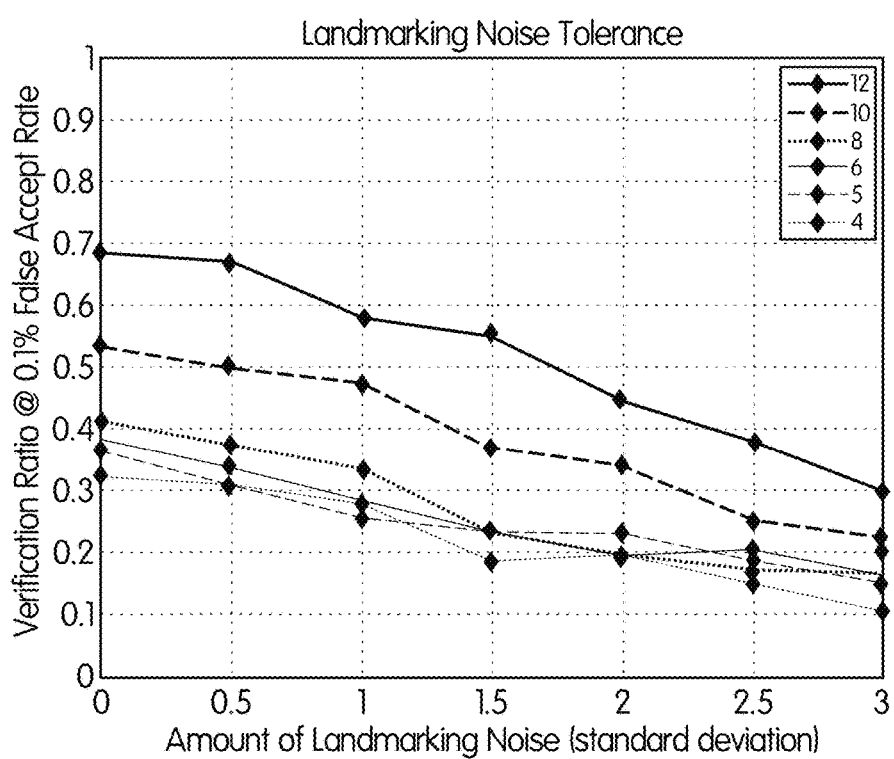
FIG. 21 shows verification rates at 0.1% False Accept Rate of the WGHA technique for increasing levels of landmarking noise added to manually annotated low-resolution synthesized images from the CMU Multi-PIE Face database. Each plot line represents a different inter-pupillary distance in the probe image.

With the same synthesized low-resolution probe input as in other experiments, we add increasing levels of noise to the manual landmarks of the low-resolution images. The gallery once again consists of the high-resolution images from the CMU Multi-PIE database. Performance trends of the WGHA algorithm for this experiment are shown in FIG. 21. Understandably, with extremely low resolution images, and without reliable structural input, the system fails to perform adequately for recognition.

Real-World Applications

The analysis of any face recognition system is incomplete without evaluation on data that is representative of real-world conditions. So far, all our experiments have been conducted on controlled datasets which are captured in carefully monitored laboratory settings under single degradation conditions. In this section, we explore the effectiveness at two unconstrained problems. The first of these is an evaluation with images taken in the wild, where intra-person appearance variations caused by multiple, simultaneous degradations are considerably larger than inter-person appearance variations. Next, we test our face matching performance against a very large mugshot database, to simulate a real analyst's perspective of our system.

Labeled Faces in the Wild

The Labeled Faces in the Wild database, published in 2007, contains 13,233 face images of 5,749 individuals, with 1,680 of these subjects appearing in more than two images. The medium-low resolution images that constitute the dataset are taken from Yahoo! News, and show large variations in pose, expression, lighting, age, occlusions, and several other degradations. It is commonly regarded in the face recognition community to be a challenging, standard benchmark dataset for face analysis techniques. Although the database also provides "funneled" images which are aligned, we use only the original image data for our purposes, and perform our own alignment using a fully-automated implementation of a recent facial alignment technique. The alignment also provides us with 3D pose information and occlusion cues. The resolution of the face is determined directly from the observed inter-pupillary distance. Hence, in this test, we are evaluating the performance of our system at simultaneously handling four different degradations: pose, occlusion, illumination and resolution, all in a fully-automated manner.

The major contribution of this work is in the representation and recovery of faces; we accomplish both of these in a completely unsupervised, fashion—at no point during the alignment, representation, recovery, or coefficient generation stages do we use labeled training data. We hence follow the "unsupervised" protocol for the LFW database. Degradation estimation is also performed in a fully automated fashion, and we use the unsupervised 'Cosine" similarity metric on WK-SVD coefficients, as defined earlier.

Figure 22:
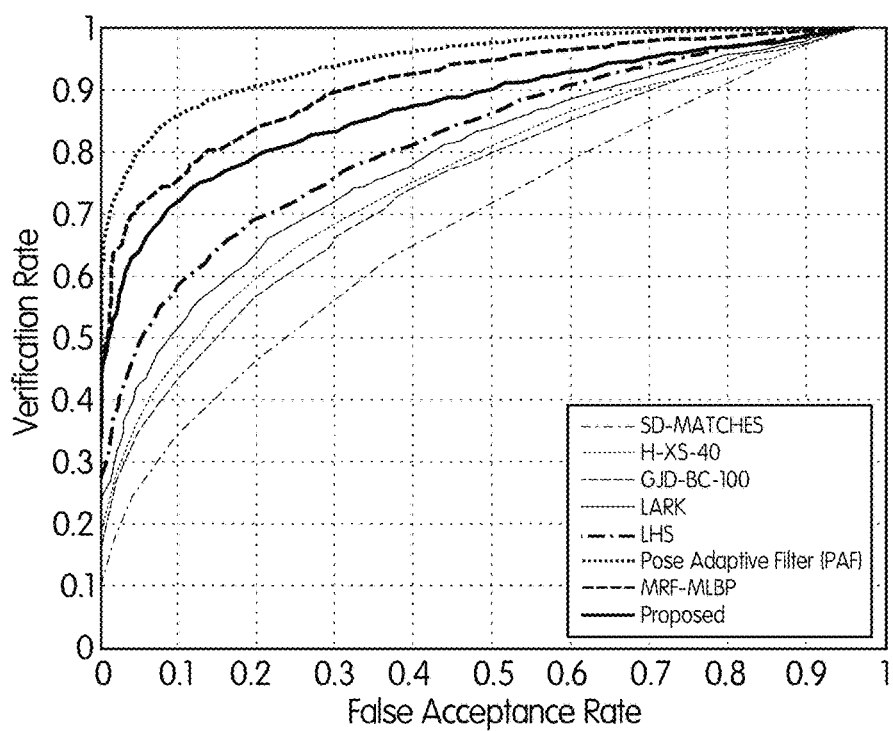
FIG. 22 shows comparison of the proposed approach using the Cosine distance matching technique against other published works using "unsupervised" protocol of the Labeled Faces in the Wild (LFW) database.

Our approach obtains an Area-Under-the-Curve (AUC) performance of 88.69, averaged over the 10-folds of View 2. The averaged ROC curve obtained, as well as those of best performing unsupervised techniques in literature, are demonstrated in FIG. 22. The two techniques which outperform ours are the Pose-Adaptive Filter and MRF-MLBP, which extract sophisticated Gabor wavelet features and multi-resolution LBP features, respectively. Clearly, our proposed technique is comparable to state-of-the-art performance on this very difficult dataset, even though there is no advanced feature extraction involved.

Large-Scale Face Recognition

There are several applications where near-field acquisition of the face is difficult or impossible, including field investigations, search & rescue operations, certain surveillance systems, etc. In several of these and other applications, the target database is also extremely large, often in the hundreds of thousands or millions of images.

We conducted a field test to verify performance of our system at faces acquired at long range, by constructing an in-house dataset of a few subjects imaged at a distance of several hundred meters, on the CMU campus. We captured 15 images of 7 subjects at a distance between 300-350 m, by using a reasonably sophisticated imaging system: we used a tripod-mounted Canon EOS60D camera configured with a Canon 800 mm telephoto lens with a 1.4× focal length extender. The images were captured in bright sunlight, which caused several cast and attached shadows on the faces, as well as caused several of the subjects to display a squinting/frowning expression. High-resolution images of the same subjects were also captured under more controlled laboratory conditions, at a different date.

We then set up a recognition experiment to test our system: the gallery consisted of 100,000 images taken from the Pinellas County Sherriff's Office booking system, along with the high-resolution images of the lab subjects, with the 15 distance captures as probe images. The fiducial points were provided for each image, and they were also processed for illumination.

Figure 23:
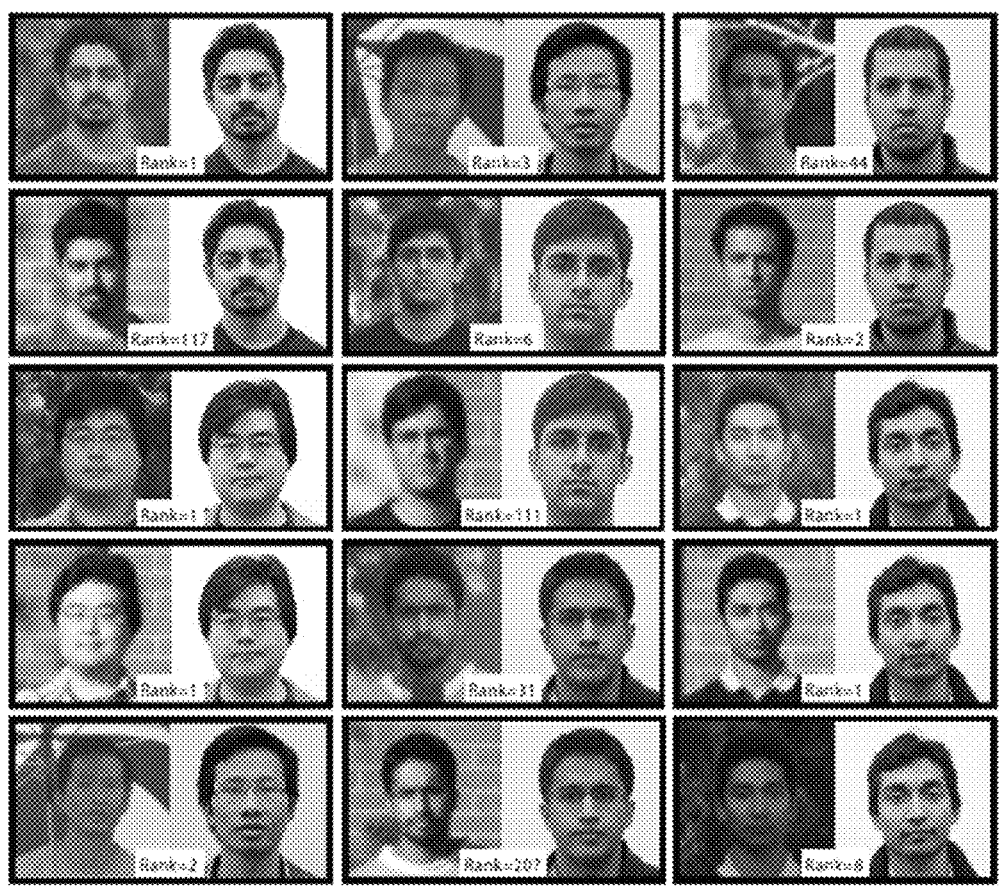
FIG. 23 shows experimental results for the large scale face recognition experiments. Each pair consists of a matching probe (left) and target (right) image. The target dataset also contains 100,000 other images taken from the Pinellas County Sherriff's Office booking system. The matching rank IDs are shown for each pair of images.

The results, shown in FIG. 23 demonstrate surprisingly good performance at this test. 5 out of the 15 probe images were correctly matched to their corresponding targets as the top rank, and 10 of them within the top 8 ranks.

Figure 27:
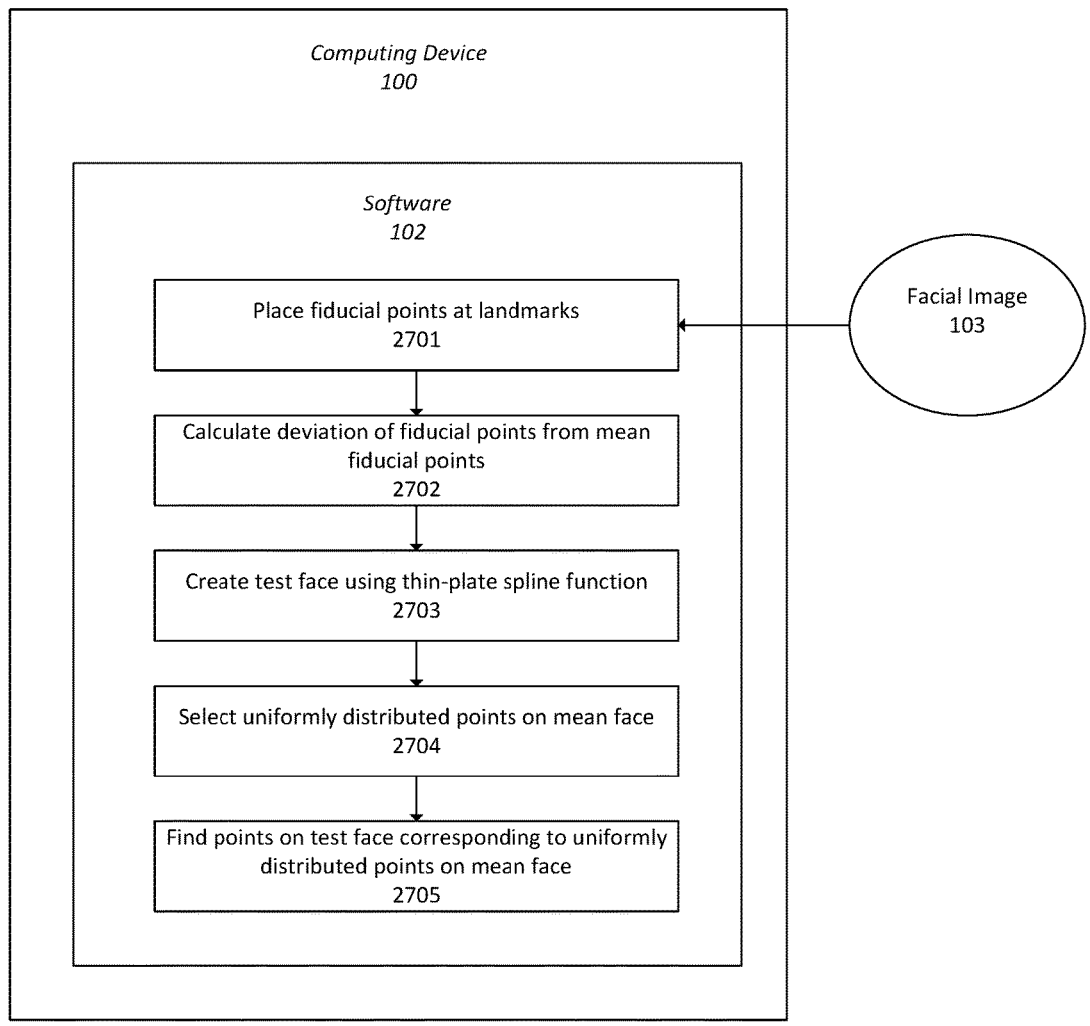
FIG. 27 shows a system diagram suitable for implementing the invention, as well as a flowchart showing the steps of the method.

FIG. 26 is a chart showing the mesh densification process being used as the basis for correcting other degradations in an image. FIG. 27 shows the computing device 100 executing software 102, which is shown in flowchart form. The flowchart represents the mesh densification process, which is used as a basis for correcting the degradations of the face in the image. At step 2701, a plurality of fiducial points are placed at landmarks on the face. Each of the fiducial points corresponds to fiducial points for a mean face calculated over a plurality of faces contained in a database. At 2702, the deviation of each fiducial point from its corresponding mean fiducial point is calculated. At 2703, a thin-plate spline function is used to create a test face by minimizing a function which provides a measure of smoothness of the deviation of the fiducial points from the mean fiducial points. At 2704 a set of uniformly-distributed points are selected on the mean face and, at 2705, a set of points on the test face corresponding to the unit uniformly-distributed set of points on a mean face is specified.

We claim:

1. A system for correcting for degradations in a 2D image of a face captured with an image sensor, comprising:
   a computing device executing software for performing the functions of:
   (a) placing a plurality of fiducial points at landmarks on said face, each of said fiducial points corresponding to a fiducial point for a mean face calculated over a database set of faces;
   (b) calculating a function which captures the deviation of each fiducial point from said mean fiducial point;
   (c) using a thin-plate spline function to create a test face by minimizing a function which provides a measure of the smoothness of the function calculated in step (b);
   (d) selecting a set of uniformly-distributed points on said mean face; and
   (e) finding a set of points on said test face corresponding to said uniformly-distributed set of points on said mean face.

2. The system of claim 1 wherein said degradation is a 3D pose variation, said software further performing the functions of:
   adjusting said 2D image to correct for pitch, roll and yaw;
   forming triangles from said set of points on said test face;
   computing the normal direction n to all of said triangles;
   computing the vertex normals as a weighted average of the normal directions of the triangles that it belongs to, where the weights are in direct proportion to the area of each triangle; and
   using said vertex normals as an indicator of the visibility of the corresponding vertex.

3. The system of claim 1 wherein said degradation is an occlusion, said software further performing the functions of:
   accepting an occlusion mask defining areas of occlusion; and
   approximating the locations of fiducial points in said areas of occlusion.

4. The system of claim 3 wherein said approximated locations of fiducial points in said areas of occlusion are accepted manually.

5. The system of claim 4 wherein textural and structural information in the occluded area of said test face is ignored.

6. The system of claim 1 wherein said degradation is low resolution, said software further performing the function of:
   computing said thin-plate spline-based representation of said face using a mean face from said database which has been lowered in resolution to match the resolution of said image.

7. The system of claim 1 wherein said software further performs the function of providing a textural value for each point in said set of points on said test face.

8. The system of claim 7 wherein said textural value is a grayscale value.

9. The system of claim 1 wherein said software further performs the function of calculating an observational confidence value for each point in said set of points on said test face.

10. The system of claim 9 wherein a point of said test face is assigned a placeholder value if the actual value of said point is not available due to degradation, and further wherein the corresponding observational confidence value is set to 0.

11. The system of claim 9 wherein said observational confidence values are calculated as a function of a camera projection model and a 3D rotation estimate.

12. The system of claim 11 wherein said 3D rotation estimate is calculated along the pitch and yaw axes.

13. The system of claim 2 wherein said visibility of each point in said test face is computed by:
   forming triangles between all of said points on said test face;
   computing the normal direction to all of said triangles; and
   computing the normals of each of said points as the weighted average of all triangles to which said point belongs.

14. The system of claim 13 wherein said weights are proportional to the area of each of said triangles.

15. The system of claim 14 wherein said visibility of each point in said test face is a function of the angle between said normal of each point and the viewing direction.

16. The system of claim 1 wherein said landmarks on said face are at pre-defined locations and further wherein there are 79 fiducial points.

17. The system of claim 1 further comprising using said face corrected for degradations in a face-recognition application.

* * * * *